United States Patent
Chakraborty et al.

(10) Patent No.: US 10,484,102 B2
(45) Date of Patent: Nov. 19, 2019

(54) SIGNALING MECHANISM TO ENABLE LOCAL OPERATION FOR MULTI-ANTENNA WIRELESS COMMUNICATION SYSTEMS

(71) Applicant: QUALCOMM Incorporated, San Diego, CA (US)

(72) Inventors: Kaushik Chakraborty, San Diego, CA (US); Tao Luo, San Diego, CA (US); Andrzej Partyka, Bedminster, NJ (US); Sumeeth Nagaraja, San Diego, CA (US); Sony Akkarakaran, Poway, CA (US); Makesh Pravin John Wilson, San Diego, CA (US); Aitzaz Ahmad, Mason, OH (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/492,982

(22) Filed: Apr. 20, 2017

(65) Prior Publication Data
US 2018/0069681 A1 Mar. 8, 2018

Related U.S. Application Data

(60) Provisional application No. 62/383,099, filed on Sep. 2, 2016.

(51) Int. Cl.
*H04L 5/00* (2006.01)
*H04W 24/08* (2009.01)
(Continued)

(52) U.S. Cl.
CPC .......... *H04B 15/00* (2013.01); *H04B 17/318* (2015.01); *H04L 5/0048* (2013.01);
(Continued)

(58) Field of Classification Search
None
See application file for complete search history.

(56) References Cited

U.S. PATENT DOCUMENTS

| 5,987,021 A | 11/1999 | Erickson et al. |
| 8,457,015 B2 | 6/2013 | Ke et al. |

(Continued)

FOREIGN PATENT DOCUMENTS

| WO | 2012171716 A1 | 12/2012 |
| WO | 2015106237 A1 | 7/2015 |
| WO | 2016036158 A1 | 3/2016 |

OTHER PUBLICATIONS

"3rd Generation Partnership Project; Technical Specification Group Radio Access Network; Evolved Universal Terrestrial Radio Access (EUTRA) and Evolved Universal Terrestrial Radio Access Network (EUTRAN); Overall description; Stage 2 (Release 13)", 3GPP Standard; 3GPP TS 36.300, vol. RAN WG2, No. V13.4.0, Jul. 7, 2016.

(Continued)

*Primary Examiner* — Eunsook Choi
(74) *Attorney, Agent, or Firm* — Arent Fox LLP

(57) ABSTRACT

An apparatus capable of self-calibration in a low-interference environment is desired. In an aspect, the apparatus may be a user equipment (UE) or a neighboring base station. The device receives, from a base station, a self-calibration notification indicating one or more resources allocated for a self-calibration of the base station. The device performs, in response to the self-calibration notification, at least one of deactivating at least one component of the device based on the one or more allocated resources or adjusting utilization of the one or more allocated resources allocated for the self-calibration of the base station.

28 Claims, 19 Drawing Sheets

(51) Int. Cl.
*H04B 15/00* (2006.01)
*H04B 17/318* (2015.01)
*H04W 72/04* (2009.01)
*H04W 72/08* (2009.01)
*H04W 24/02* (2009.01)
*H04W 52/02* (2009.01)
*H04L 25/02* (2006.01)
*H04L 1/00* (2006.01)
*H04W 52/32* (2009.01)

(52) U.S. Cl.
CPC .......... *H04L 5/0069* (2013.01); *H04W 24/02* (2013.01); *H04W 24/08* (2013.01); *H04W 52/0235* (2013.01); *H04W 52/0258* (2013.01); *H04W 72/04* (2013.01); *H04W 72/044* (2013.01); *H04W 72/048* (2013.01); *H04W 72/082* (2013.01); *H04L 1/0026* (2013.01); *H04L 5/0023* (2013.01); *H04L 25/0202* (2013.01); *H04W 52/325* (2013.01); *H04W 72/046* (2013.01); *Y02D 70/00* (2018.01); *Y02D 70/1242* (2018.01); *Y02D 70/1262* (2018.01); *Y02D 70/142* (2018.01); *Y02D 70/164* (2018.01); *Y02D 70/26* (2018.01)

(56) References Cited

U.S. PATENT DOCUMENTS

| | | | |
|---|---|---|---|
| 9,020,564 B2 | 4/2015 | Zhang et al. | |
| 9,065,503 B2* | 6/2015 | Liu | H04B 7/0413 |
| 9,100,849 B2 | 8/2015 | Wang et al. | |
| 2006/0121901 A1* | 6/2006 | Tanaka | H04W 36/22 |
| | | | 455/436 |
| 2008/0242301 A1* | 10/2008 | Osterling | H04W 36/08 |
| | | | 455/436 |
| 2009/0046010 A1 | 2/2009 | Niu et al. | |
| 2010/0227618 A1* | 9/2010 | Yang | H04W 68/08 |
| | | | 455/438 |
| 2011/0194538 A1* | 8/2011 | Zheng | H04W 76/28 |
| | | | 370/335 |
| 2011/0294529 A1 | 12/2011 | Luo et al. | |
| 2013/0189976 A1 | 7/2013 | Kim et al. | |
| 2013/0260774 A1 | 10/2013 | Madaiah et al. | |
| 2014/0226511 A1 | 8/2014 | Gotman et al. | |
| 2014/0328190 A1 | 11/2014 | Lord et al. | |
| 2015/0103766 A1* | 4/2015 | Miklos | H04W 76/20 |
| | | | 370/329 |
| 2015/0133173 A1 | 5/2015 | Edge et al. | |
| 2015/0349834 A1 | 12/2015 | Chakraborty | |
| 2016/0157253 A1* | 6/2016 | Yamine | H04W 4/90 |
| | | | 455/456.2 |
| 2016/0165413 A1* | 6/2016 | Bhalla | H04W 4/08 |
| | | | 455/456.5 |
| 2016/0212706 A1* | 7/2016 | Kahtava | H04W 52/0229 |
| 2016/0308624 A1 | 10/2016 | Rong et al. | |
| 2017/0288834 A1 | 10/2017 | Yuan et al. | |
| 2018/0039555 A1 | 2/2018 | Salunke et al. | |
| 2018/0069639 A1 | 3/2018 | Chakraborty et al. | |
| 2018/0070363 A1 | 3/2018 | Chakraborty et al. | |
| 2018/0115927 A1* | 4/2018 | Vesterinen | H04W 36/0072 |

OTHER PUBLICATIONS

Mitsubishi Electric: "Discussion on Preceded SRS", 3GPP Draft, R1-092441, 3rd Generation Partnership Project (3GPP), Mobile Competence Centre, 650, Route Des Lucioles, F-06921 Sophia-Antipolis Cedex, France, No. Los Angeles, USA, Jun. 23, 2009, Jun. 23, 2009 (Jun. 23, 2009), pp. 1-6, XP050350953, [retrieved on Jun. 23, 2009] paragraphs [0002]. [3. 4)]. [5. 2)], figures 2,3.

Nokia et al., "Channel Reciprocity Support in NR", 3GPP Draft; R1-167282, 3rd Generation Partnership Project (3GPP), Mobile Competence Centre, 650, Route Des Lucioles, F-06921, Sophia-Antipolis Cedex, France, vol. RAN WG1, No. Gothenburg, Sweden; Aug. 21, 2016, XP051140617, Retrieved from the Internet: URL:http://www.3gpp.org/ftp/Meetings_3GPP_SYNC/RAN1/Docs/ [retrieved on Aug. 21, 2016], 4 pages.

Tsang Y.M., et al., "Detecting Human Blockage and Device Movement in mmWave Communication System", Global Telecommunications Conference, IEEE, Dec. 5, 2011, pp. 1-6, XP032119638, DOI: 10.1109/GLOCOM.2011.6134444, ISBN: 978-1-4244-9266-4.

International Search Report and Written Opinion—PCT/US2017/048951—ISA/EPO—dated Nov. 20, 2017.

* cited by examiner

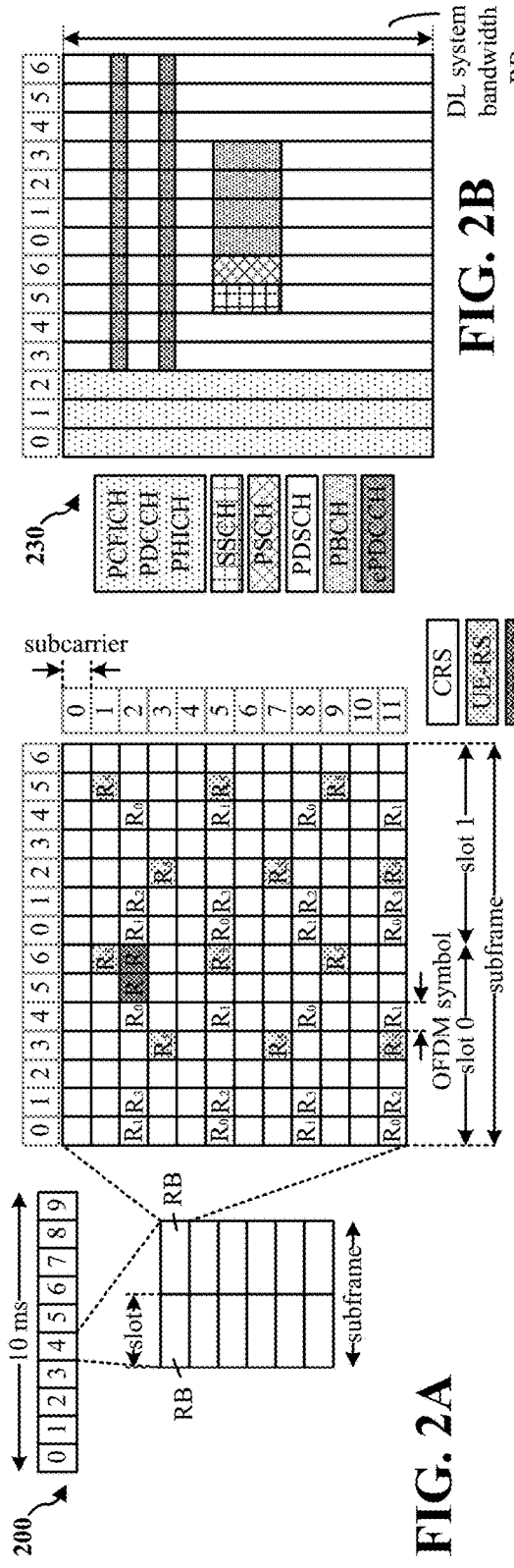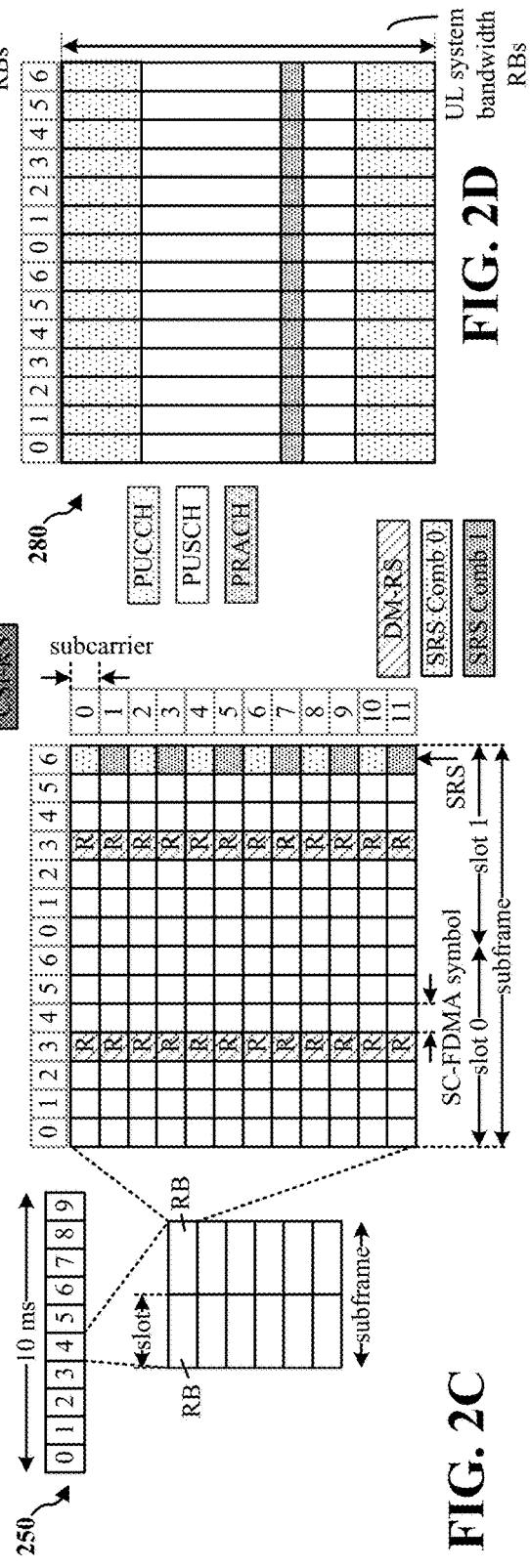
FIG. 2A  FIG. 2B  FIG. 2C  FIG. 2D

US 10,484,102 B2

SIGNALING MECHANISM TO ENABLE LOCAL OPERATION FOR MULTI-ANTENNA WIRELESS COMMUNICATION SYSTEMS

CROSS-REFERENCE TO RELATED APPLICATION(S)

This application claims the benefit of U.S. Provisional Application Ser. No. 62/383,099, entitled "SIGNALING MECHANISM TO ENABLE SELF-CALIBRATION FOR MILLIMETER-WAVE COMMUNICATION" and filed on Sep. 2, 2016, which is expressly incorporated by reference herein in its entirety.

BACKGROUND

Field

The present disclosure relates generally to multi-antenna wireless communication systems, and more particularly, to a calibration of a user equipment and/or a base station.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. However, as the demand for mobile broadband access continues to increase, there exists a need for further improvements in LTE technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

A user equipment (UE) may perform a local operation that is local to the UE and/or a base station may perform a local operation that is local to the base station. One way to perform a local operation such as over-the-air self-calibration is to transmit a predefined reference signal from certain antenna elements and to perform the local operation based on measurements based on the transmitted signal. In order to perform the local operation accurately, the propagation of the reference signal from the transmit antenna elements to the receive antenna elements should not be affected by interference from other UEs and/or base stations. Additionally, transmission of the reference signal for the local operation may create undesirable interference to UEs and/or base stations in the vicinity. Therefore, coordination between a UE and a base station may be desirable to minimize interference or other undesirable effects during a local operation of a UE or a base station.

In an aspect of the disclosure, a method, a computer-readable medium, and an apparatus are provided. The apparatus may be a device. The device may be a UE or a neighboring base station. The device receives, from a base station, a self-calibration notification indicating one or more resources allocated for a self-calibration of the base station. The device performs, in response to the self-calibration notification, at least one of deactivating at least one component of the device based on the one or more allocated resources or adjusting utilization of the one or more allocated resources allocated for the self-calibration of the base station.

In an aspect, the apparatus may be a device. The device may be a UE or a neighboring base station. The device may include means for receiving, from a base station, a self-calibration notification indicating one or more resources allocated for a self-calibration of the base station, and means for performing, in response to the self-calibration notification, at least one of deactivating at least one component of the device based on the one or more allocated resources or adjusting utilization of the one or more allocated resources allocated for the self-calibration of the base station.

In an aspect, the apparatus may be a device including a memory and at least one processor coupled to the memory. The device may be a UE or a neighboring base station. The at least one processor may be configured to: receive, from a base station, a self-calibration notification indicating one or more resources allocated for a self-calibration of the base station, and perform, in response to the self-calibration notification, at least one of deactivating at least one component of the device based on the allocated one or more resources or refraining from utilizing the one or more resources allocated for the self-calibration of the base station.

In an aspect, a computer-readable medium storing computer executable code for a device, may include code to: receive, from a base station, a self-calibration notification indicating one or more resources allocated for a self-calibration of the base station, and perform, in response to the self-calibration notification, at least one of deactivating at least one component of the device based on the one or more allocated resources or adjusting utilization of the one or more allocated resources allocated for the self-calibration of the base station.

In an aspect of the disclosure, a method, a computer-readable medium, and an apparatus are provided. The apparatus may be a base station. The base station allocates one or more resources for self-calibration of the base station. The base station transmits, to one or more devices, a self-calibration notification indicating the allocated one or more resources, the one or more devices including at least one UE, or at least one neighboring base station, or a combination thereof. The base station performs the self-calibration of the base station based on the allocated one or more resources.

In an aspect, the apparatus may be a base station. The base station may include means for allocating one or more resources for self-calibration of the base station, means for transmitting, to one or more devices, a self-calibration notification indicating the allocated one or more resources, the one or more devices including at least one UE, or at least one neighboring base station, or a combination thereof, and means for performing the self-calibration of the base station based on the allocated one or more resources.

In an aspect, the apparatus may be a base station including a memory and at least one processor coupled to the memory. The at least one processor may be configured to: allocate one or more resources for self-calibration of the base station, transmit, to one or more devices, a self-calibration notification indicating the allocated one or more resources, the one or more devices including at least one UE, or at least one neighboring base station, or a combination thereof, and perform the self-calibration of the base station based on the allocated one or more resources.

In an aspect, a computer-readable medium storing computer executable code for a base station, may include code to: allocate one or more resources for self-calibration of the base station, transmit, to one or more devices, a self-calibration notification indicating the allocated one or more resources, the one or more devices including at least one UE, or at least one neighboring base station, or a combination thereof, and perform the self-calibration of the base station based on the allocated one or more resources.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating LTE examples of a DL frame structure, DL channels within the DL frame structure, an UL frame structure, and UL channels within the UL frame structure, respectively.

DETAILED DESCRIPTION

Figure 1:
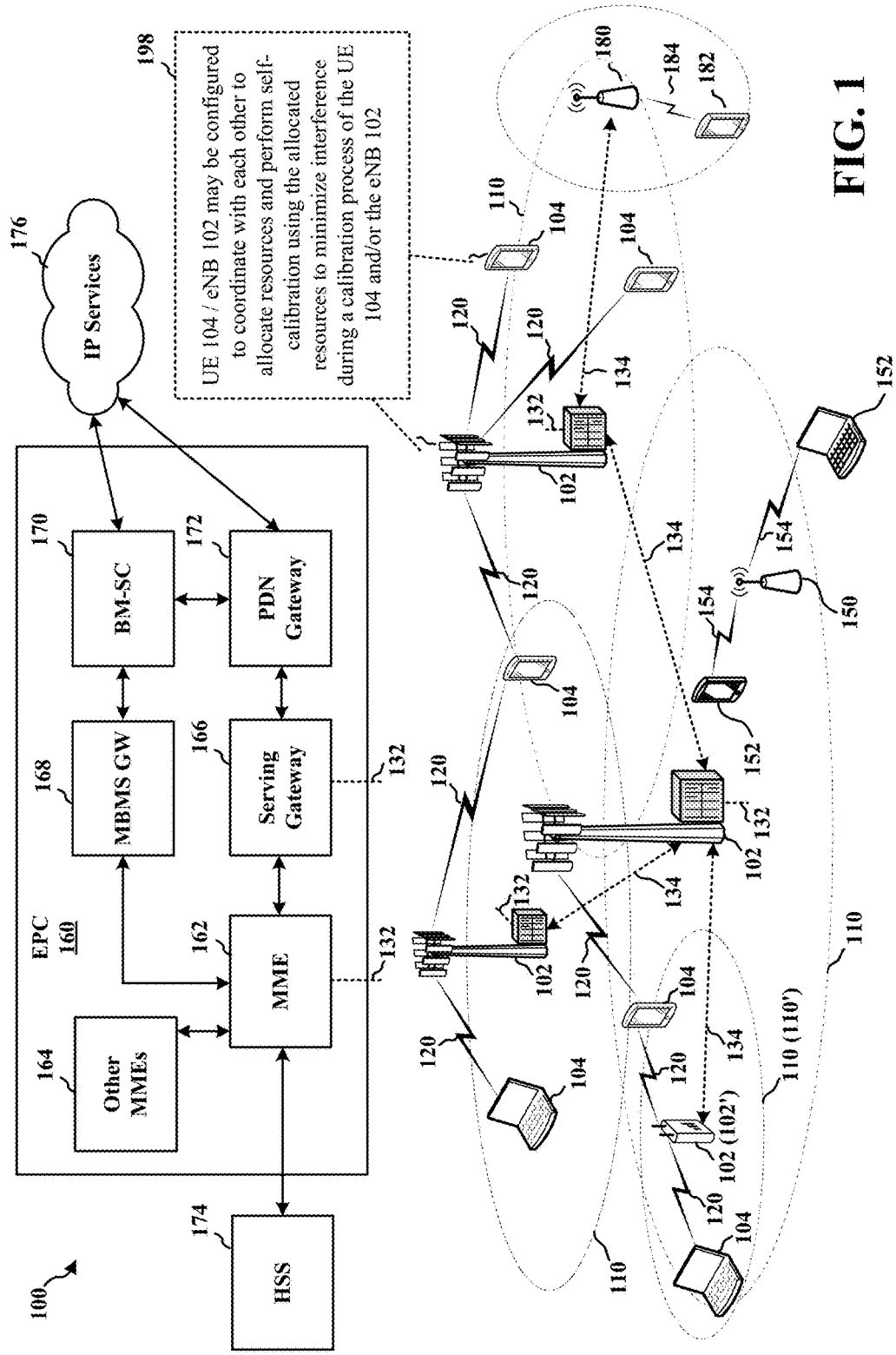
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include eNBs. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X 2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire.

The millimeter wave (mmW) base station 180 may operate in mmW frequencies and/or near mmW frequencies in communication with the UE 182. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 182 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions.

The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104/eNB 102 may be configured to coordinate with each other to allocate resources and perform self-calibration using the allocated resources to minimize interference during a calibration process of the UE 104 and/or the eNB 102 (198).

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
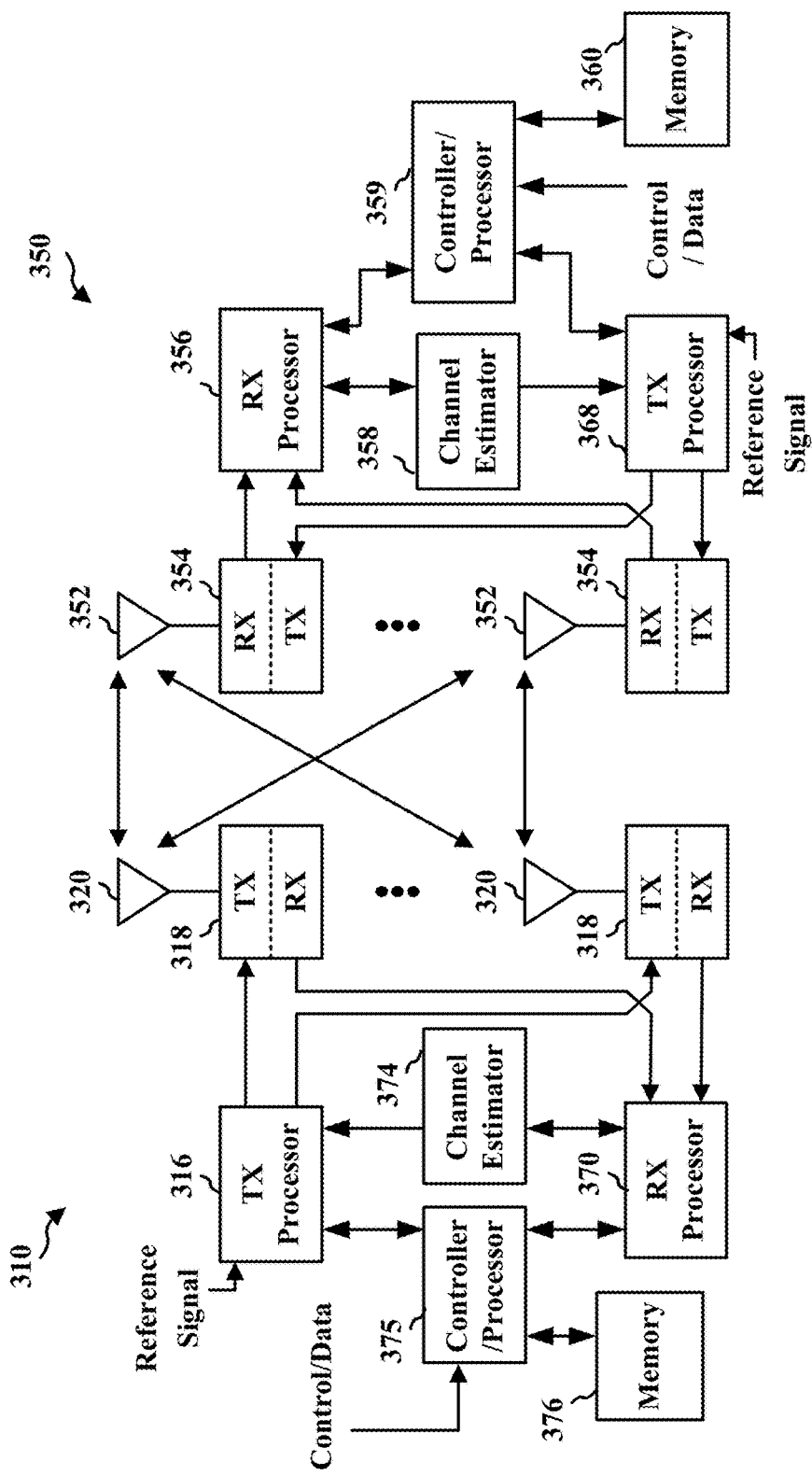
FIG. 3 is a diagram illustrating an example of an evolved Node B (eNB) and user equipment (UE) in an access network.

FIG. 3 is a block diagram of an eNB 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Wireless communication systems employing narrow bandwidths and high frequency carriers are being deployed. For example, an mmW system may be utilized for wireless communication at a high transmission frequency. In mmW systems, when the carrier frequency is high (e.g., 28 GHz), path loss may be high. For example, the carrier frequency for mmW communication may be 10 times higher than a carrier frequency for other types of wireless communication. Thus, the mmW system may experience path loss that is approximately 20 dB higher than other types of wireless communication cases operating at lower frequencies. To mitigate the higher path loss in mmW systems, a base station may perform a transmission in a directional manner by beam-forming the transmission in order to focus the transmission in one or more particular directions.

If the carrier frequency for wireless communication is a higher frequency, the wavelength of the carrier is shorter. A shorter wavelength may allow a higher number of antennas to be implemented within a given antenna array length than a number of antennas that can be implemented within the given antenna array length when a lower carrier frequency is used. Therefore, in the mmW system (using a higher carrier frequency), a higher number of antennas may be used in a base station and/or a UE. For example, the base station may have 128 or 256 antennas and the UE may have 8, 16 or 24 antennas. With the higher number of antennas, a beam-forming technique may be used to digitally change the direction of a beam by applying various phases to different antennas. Because beam-forming in the mmW system may provide a narrower beam with increased gain at the receiver, the base station may utilize the narrow beam feature to transmit a synchronization signal in various directions using multiple narrow beams so as to provide coverage over a wider area.

Due to the directional nature of a beam-formed beam, for a UE to obtain a desirable gain in the mmW system, the base station may need to point the beam directly at a UE such that the direction of the beam aligns with the location of the UE, in order for the UE to have an acceptable signal strength (e.g., SNR, gain). If the direction of the beam is not properly aligned with the location of the UE, the antenna gain at the UE may be undesirably low (e.g., resulting in low SNR, high block error rates, etc.). Further, when a particular UE enters the mmW system (e.g., by entering a coverage area of the mmW system or by being activated) and receives transmitted data from the base station over the mmW system, the base station should be able to determine the best beam(s) (e.g., beam(s) with high SNR/gain and/or low block error rate) for mmW communication with the particular UE. Thus, the base station may use all available beams to transmit beam reference signals (BRSs) in all available beam directions so that the UE may identify the best beam out of the beams received from the base station based on measurements of the BRSs. In the mmW communication system, using each beam, the base station may also transmit a primary synchronization signal (PSS), a secondary synchronization signal (SSS), an extended synchronization signal (ESS), and PBCH signals for synchronization and for broadcasting system information. In the mmW communication system, such signals may be transmitted directionally using multiple beams in multiple directions to provide a wider coverage area.

Figure 4B:
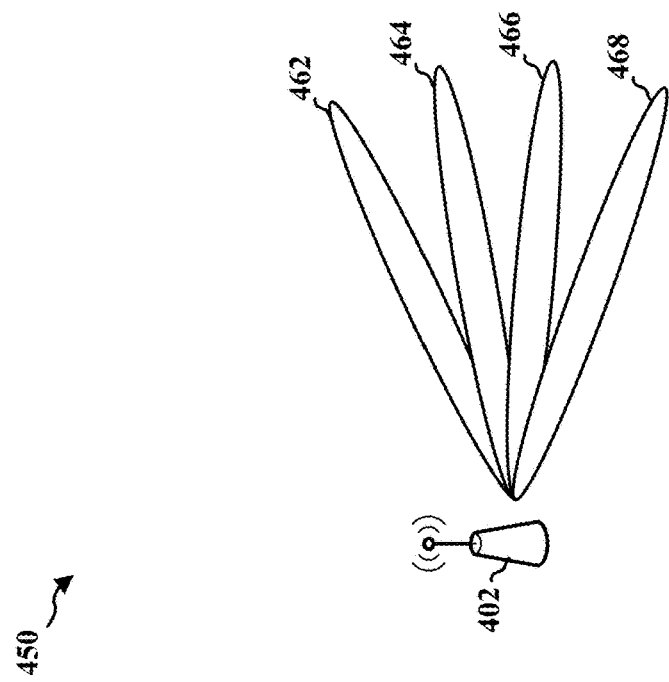
FIGS. 4A and 4B are example diagrams illustrating the base station sweeping in multiple directions in a first symbol and a second symbol, respectively.
Figure 4A:
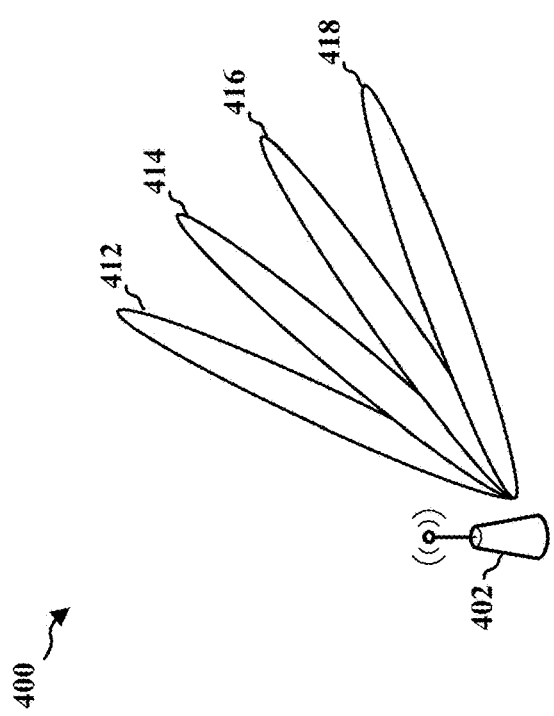

If there are multiple antenna ports (multiple sets of antennas) in the base station, the base station may transmit multiple beams per symbol. For example, the base station may use multiple antenna ports in a cell specific manner in a first symbol of a synchronization sub-frame to sweep in multiple directions. The base station may then sweep in multiple directions using the multiple antenna ports in a cell specific manner in another symbol of the synchronization sub-frame. Each antenna port may include a set of antennas. For example, an antenna port including a set of antennas (e.g., 64 antennas) may transmit one beam, and multiple antenna ports may transmit multiple beams, each in a different direction. Thus, if there are four antenna ports, the four antenna ports may sweep through four directions (e.g., transmit four beams, each in a different direction). FIGS. 4A and 4B are example diagrams illustrating the base station sweeping in multiple directions in a first symbol and a second symbol, respectively. As shown in FIGS. 4A and 4B, the base station may sweep in different directions in each symbol, e.g., the angular/directional range of the beams in FIG. 4A is different from the angular/directional range of the beams in FIG. 4B. FIG. 4A is an example diagram 400 illustrating transmission of beams in a first symbol. A base station 402 in this example has four antenna ports, and thus may transmit four beams 412, 414, 416, and 418 in four different directions in the first symbol (e.g., each beam being transmitted in a different direction). FIG. 4B is an example diagram 450 illustrating transmission of beams in a second symbol. Since the base station 402 has four antenna ports, four beams 462, 464, 466, and 468 may be transmitted in four different directions in the second symbol (e.g., each beam being transmitted in a different direction). In one aspect, the beams transmitted by the base station during the same symbol may not be adjacent with each other.

In mmW communication, a signal communicated via beamforming by a base station and/or a UE should be within a certain accuracy. Otherwise, a calibration may be performed to achieve the certain accuracy. For example, UEs and/or customer premises equipments (CPEs) may support hybrid beamforming using dynamically-configurable analog RF chains and digital antenna ports. Within a single device, there may be a large number of RF components (e.g., antenna elements, variable gain amplifiers (VGAs), phase shifters (PSs)), to support such a beamforming feature. Thus, calibration of an amplitude and a phase for various RF components may be desirable to maintain signal fidelity and reliability. However, a calibration procedure for a large number of components may be challenging for various reasons, such as circuit complexity, added cost of the components for calibration, and high time consumption for performing the calibration procedure. Therefore, a calibration procedure with reduced complexity, lower cost, and reduced time consumption is desired.

In one example of a calibration method, an external test equipment may be used to calibrate RX chain components, where the external test equipment may generate an external reference signal of a known amplitude and a known phase that is input to the RX chain components. Measurements of the external reference signal at various reference points in the RX chain components may be used to estimate amplitude errors and phase errors and to calibrate the receive chain components to within certain error tolerances. As an alternative, an additional hardware component to perform calibration may be implemented within the UE, which may increase cost and complexity of the UE. Such techniques may have the following drawbacks. A setup for the external test equipment or the additional hardware test component may be complex and expensive. A precise control of movement of the probe used for measuring the reference signal may be required. Further, the techniques may only support offline calibration, and may not support run-time calibration (e.g., to compensate for errors due to temperature variation).

In another example of a calibration method, additional hardware components (e.g. couplers at antenna ports) may be used to inject a portion of a TX signal back into an RX path. In particular, a reference signal (e.g., a portion of the TX signal) generated in a TX baseband may be looped back to an RX baseband (e.g., via coupling of the transmitted signal from the transmit path to the receive path) to calibrate the overall TX chain/RX chain. Such a method may have the following drawbacks. The method may require additional hardware components, which may increase cost and complexity. The additional hardware components may degrade overall performance (e.g., by introducing additional sources of error).

At least due to the drawbacks mentioned above, a calibration procedure that does not make use of an external test equipment or an additional hardware component may be desired. Thus, in an aspect, a UE or a CPE may perform a calibration based on a self-calibration approach, where the UE or the CPE generates and transmit a reference signal using an existing TX chain and measures certain parameters of the transmitted reference signal using one or more RX chains. The self-calibration approach may not require an external test equipment or an additional hardware component. Additionally, the UE or the CPE may perform the self-calibration autonomously. Thus, the self-calibration may not have the drawbacks of a calibration approach utilizing an external test equipment or an additional hardware component. Further, the self-calibration may be performed in a run-time mode, e.g., while operating the UE or the CPE.

For gain calibration, a TX chain may produce a signal with high gain fidelity. One region of operation where output power of a power-amplifier (PA) is consistent across various temperatures and process variations may be at a saturated output power (PSAT) level where the PA is driven into saturation. To perform a self-calibration at PSAT, the UE may transmit at a high signal level with high power. However, transmitting at the high signal level may cause unwanted interference to a base station and possibly to other neighboring UEs or base stations if the UE performs self-calibration without coordinating with the base station (e.g., the serving base station of the UE).

In addition, during calibration, the UE may not utilize beamforming in a particular direction (e.g. toward a serving base station of the UE). The UE may not utilize such beamforming during calibration for several reasons. During a calibration, beamforming by the UE may not be feasible because the UE may actively transmit using a single TX antenna element (or a small number of TX antenna elements) instead of using all TX antenna elements, to reduce calibration complexity introduced by multiple TX components. To ensure that the coupling of the transmitted beam with an adjacent RX chain provides sufficient signal strength, the transmitted beam may need to provide wide coverage.

At least for the reasons discussed above, transmitting a reference signal using a TX chain to perform self-calibration may cause interference over a wider spatial area in the vicinity of the UE. Therefore, coordination between a UE and a base station (e.g., the serving base station) may be needed to reduce interference and/or other undesirable effects due to self-calibration.

Additionally, in mmW communication, transmitting a signal through living human tissue should be avoided because, for example, radiation from the transmission may be harmful to the human tissue. For example, if a user is holding a UE with a hand and the hand is in an uplink transmission path of the UE, the UE should avoid transmitting a signal via the uplink transmission path or at least should reduce the transmit power, such that no harm or reduced harm is done to the human tissue of the hand. However, if an object in the uplink transmission path is not composed of living human tissue, then transmission via the uplink transmission path may not have a harmful effect and thus the UE may not reduce signal strength of the UE transmission via the uplink transmission path. In order to determine whether an object is present on an uplink transmission path of the UE and/or to determine what type of object is present on the uplink transmission path of the UE, coordination between a UE and a base station (e.g., serving base station) may be desired.

According to an aspect of the disclosure, resources may be allocated by the base station for one or more local operations of one or more UEs, such that reduced interference may be experienced on the allocated resources during the one or more local operations. A local operation may be an operation that is performed by a UE and is local to the UE, without involving communication with another network entity (e.g., a base station or another UE). The local operation may be self-calibration of the UE and/or transmission blockage detection. In one aspect of the disclosure, a UE (or a CPE) notifies a base station serving the UE that the UE will perform a local operation by transmitting a local operation notification to the base station. The local operation notification may indicate a local operation to be performed by the UE. The local operation notification may be transmitted via at least one of a MAC control element or physical layer signaling (e.g., layer-1 signaling). In response to the local operation notification, the base station may allocate resources for the local operation. The allocated resources may be uplink resources. The base station may allocate the resources for the local operation by clearing out (e.g., freeing up) the resources allocated to the UE for the local operation. In an aspect, the base station may clear out resources for the local operation of the UE by allocating the resources to the UE for the local operation and not allocating the same resources to any other UE for other purposes (e.g., during the local operation). Because the allocated resources are cleared out for the local operation of the UE, the UE may perform the local operation using the allocated resources with reduced interference on the allocated resources from other UEs. After allocating the resources for local operation, the base station may send a resource indicator indicating the allocated resources to the UE. In an aspect, the resource indicator may be sent in a grant of the allocated resources. The base station may send the resource indicator via a control channel such as a PDCCH.

When the UE receives the resource indicator of the allocated resources, the UE may utilize the allocated resources to perform the local operation based on the resource indicator. In particular, the UE may perform an uplink transmission (e.g., using a TX chain) of a reference signal using the allocated resources indicated in the resource indicator. Subsequently, the UE may determine certain parameters based on the transmitted reference signal, and perform the local operation based on the determined parameters. In an aspect, the reference signal may include at least one of a demodulation reference signal, a sounding reference signal, or a newly-defined local operation reference signal that may be used for the local operation. The UE may transmit the reference signal via an uplink communication channel, such as a PUCCH, a PUSCH, a sounding reference signal channel, or a RACH. For example, if a demodulation reference signal is used as a the reference signal, the reference signal may be sent via PUCCH and/or PUSCH. For example, if a sounding reference signal is used as the reference signal, the reference signal may be sent via a sounding reference signal channel. For example, if a newly-defined reference signal is used as the reference signal, the reference signal may be sent via RACH signaling on the RACH.

In one aspect of the disclosure, the local operation may be self-calibration of a UE, and thus the local operation notification may be a self-calibration notification. In an aspect, a UE (or a CPE) notifies a base station serving the UE that the UE wants to perform a self-calibration by transmitting a self-calibration notification to the base station. The self-calibration notification may indicate a self-calibration to be performed by the UE. The self-calibration notification may be transmitted via at least one of a MAC control element or physical layer signaling (e.g., layer-1 signaling). In response to the self-calibration notification, the base station may allocate resources for the self-calibration. The base station may allocate the resources for the self-calibration by clearing out (e.g., freeing up) the resources allocated to the UE for self-calibration. In an aspect, the base station may clear out resources for self-calibration of the UE by allocating the resources to the UE for self-calibration and not allocating the same resources to any other UE for other purposes (e.g., during the calibration procedure). Because the allocated resources are cleared out for self-calibration of the UE, the UE may perform self-calibration using the allocated resources with reduced interference on the allocated resources from other UEs. After allocating the resources for self-calibration, the base station sends a resource indicator indicating the allocated resources to the UE. The resource indicator may be sent in a grant of the allocated resources. In an aspect, the base station may send the resource indicator via a control channel such as a PDCCH. When the UE receives the resource indicator of the allocated resources, the UE may utilize the allocated resources to perform a self-calibration based on the resource indicator. In particular, to perform the self-calibration, the UE may transmit (e.g., via a TX chain) a reference signal using the allocated resources indicated in the resource indicator. Subsequently, the UE may measure certain parameters of the transmitted reference signal received by the RX chain. In an aspect, the UE may measure the parameters of the reference signal on frequencies corresponding to the allocated resources.

In an aspect, the UE may perform the self-calibration based on the measured parameters of the reference signal (e.g., reference signal received by the RX chain) and based on standard parameters of the reference signal, where the standard parameters of the reference signal may be ideal parameters of the reference signal without error or interference. For example, during the self-calibration, the UE may compare the measured parameters of the reference signal with the standard parameters of the reference signal, and calibrate the UE based on the comparison (e.g., by calibrating the UE such that the measured parameters and the standard parameters are within a certain error tolerance). The parameters may include an amplitude and/or a phase. Thus, for example, the UE may measure an amplitude and a phase of the reference signal received by the RX chain while the reference signal is being transmitted by the TX chain, and compare the measured amplitude and the measured phase of the reference signal with a standard amplitude and a standard phase, respectively, to calibrate the UE.

In an aspect, the base station may receive self-calibration notifications from multiple UEs. The base station may consider various factors such as geography, network topology, etc., e.g., to allocate resources based on relative locations of UEs and the base station. In an aspect, the reference signal may include at least one of a demodulation reference signal, a sounding reference signal, or a newly-defined calibration reference signal that may be used for calibration.

In one aspect of the disclosure, a local operation of the UE may be transmission blockage detection, and thus a local operation notification may be a transmission blockage detection notification. In an aspect, a UE (or a CPE) notifies a base station serving the UE that the UE will perform transmission blockage detection by transmitting a transmission blockage detection notification to the base station. The transmission blockage detection notification may indicate a transmission blockage detection to be performed by the UE. The transmission blockage detection notification may be transmitted via at least one of a MAC control element or physical layer signaling (e.g., layer-1 signaling). In response to the transmission blockage detection notification, the base station may allocate resources for the transmission blockage detection. The base station may allocate the resources for the transmission blockage detection by clearing out (e.g., freeing up) the resources allocated to the UE for transmission blockage detection. In an aspect, the base station may clear out resources for transmission blockage detection of the UE by allocating the resources to the UE for transmission blockage detection and not allocating the same resources to any other UE for other purposes. Because the allocated resources are cleared out for transmission blockage detection of the UE, the UE may perform transmission blockage detection using the allocated resources with reduced interference on the allocated resources from other UEs. After allocating the resources for transmission blockage detection, the base station sends a resource indicator indicating the allocated resources to the UE. The base station may send the resource indicator via a control channel such as a PDCCH.

When the UE receives the resource indicator of the allocated resources, the UE may utilize the allocated resources to perform a transmission blockage detection based on the resource indicator. In particular, to perform the transmission blockage detection, the UE may transmit (e.g., in the TX chain) a reference signal using the allocated resources indicated in the resource indicator. Subsequently, the UE may use the RX chain to receive a reflected signal of the transmitted reference signal, where the reflected signal is a result of the transmitted reference signal being reflected by an object. In an aspect, the UE may be able to determine that a received signal is a reflected signal of the transmitted reference signal if the received signal is substantially same as the transmitted reference signal. In an aspect, the reference signal may include at least one of a demodulation reference signal, a sounding reference signal, or a newly-defined blockage detection reference signal that may be used for transmission blockage detection. Based on the reflected signal, the UE may determine whether a transmission path is blocked by an object, and may determine a type of object blocking the transmission path if the transmission path is blocked. In particular, based on the reception of the reflected signal, the UE may determine a signal strength of the reflected signal and may determine a round-trip time of the reference signal, where the round-trip time is a time duration between a time that the reference signal is transmitted and a time that the reflected signal is received.

In an aspect, based on the round-trip time, the UE may distinguish a reflected signal of the transmitted reference signal from a measurement of the transmitted reference signal due to the coupling between transmission and reception. For example, there is little time delay between transmission of the reference signal and the measurement of the transmitted reference signal due to the coupling, whereas the round-trip time between the transmission of the reference signal and reception of the reflected signal is much greater. The UE may perform initial testing to set an expected time delay due to the coupling. Thus, when the UE transmits a reference signal and then measures a signal that is substantially same as the transmitted reference signal, if the time delay between transmission of the reference signal and the measurement of the signal is almost zero (e.g., less than or equal to the expected time delay due to the coupling) then the UE may determine that the measured signal is the measurement from the transmitted reference signal due to the coupling. On the other hand, if the time delay between transmission of the reference signal and the measurement of the signal is substantially greater than zero (e.g., greater than the expected time delay due to the coupling), then the UE may determine that the measured signal is a reflected signal of the transmitted reference signal as a result of reflection due to an object blocking the transmission path.

In an aspect, the UE may determine whether a transmission path is blocked by an object based on the signal strength of the reflected signal and/or the round-trip time of the reference signal. For example, the UE may determine that the transmission path is blocked by an object if the signal strength of the reflected signal is above a signal reflection threshold. An object near the UE and in the transmission path may reflect the reference signal such that the UE may receive a reflected signal with a higher signal strength. For example, the UE may determine that the transmission path is blocked if the round-trip time of the reference signal is below a time threshold. A long round-trip time (e.g., a round-trip time above the time threshold) may imply that an object in the transmission path of the reference signal is far from the UE and thus the object should not be considered as blocking the transmission path. Therefore, if the UE determines a long round-trip time (e.g., above the time threshold), then the UE may determine that the transmission path is clear of objects.

In an aspect, if the UE determines that the transmission path is blocked by an object, the UE may determine a type of the object blocking the transmission path based on the signal strength of the reflected signal and the round-trip time of the reference signal when the transmission path is blocked. For example, a signal reflected from human tissue may be weaker than a signal reflected form a harder and/or denser object (e.g., a metal or a concrete type object) because human tissue may reflect less signal energy than a harder and/or denser object. For example, the UE may determine the type of the object based on the signal strength of the reflected signal and the round-trip time because the signal strength of the reflected signal may be higher when the object is closer to the UE and thus the round-trip time is shorter, and when the object is farther away from the UE, the signal strength is lower and the round trip time is longer. Thus, for example, if a ratio of the signal strength of the reflected signal and the round-trip time is greater than an object type threshold, the UE may determine that the object type is not human tissue but an object that is harder and/or denser and/or more reflective than human tissue. On the other hand, for example, if a ratio of the signal strength of the reflected signal and the round-trip time is shorter than an object type threshold, the UE may determine that the object type is human tissue.

When the UE determines that the transmission path is blocked by human tissue, the UE may refrain from transmitting a signal via the transmission path or may reduce transmit power for transmission via the transmission path. The transmission power of the UE should not exceed an emission requirement (e.g., requirement set by FCC) for transmission when human tissue may be in the transmission path of the UE. For a 100 GHz transmission frequency, the emission requirement may be 1 milliwatt per $cm^2$ surface area and thus the transmission power of the UE should not exceed 1 milliwatt per $cm^2$. If human tissue may be in the transmission path of the UE and the transmission power (e.g., averaged over time) of the UE exceeds the emission requirement, then the UE may determine to reduce the transmit power to not exceed the emission requirement or may determine to refrain from transmission via the transmission path. For example, a hand holding the UE or a human using the UE may be in one or more transmission paths of the UE. If the UE determines that a transmission path is not blocked by an object or that the transmission path is blocked by an object with an object type different from human tissue, the UE may continue with transmission via the transmission path without reducing the transmit power.

If human tissue that may be blocking the transmission path is far from the UE, then the UE may transmit at a transmission power not limited by the emission requirement because the signal becomes attenuated over a long distance. As discussed above, the UE may determine that human tissue is far from the UE if the UE determines a long round-trip time (e.g., above the time threshold). If human tissue is not far from the UE and may be in the transmission path of the UE, then the UE may transmit at a transmit power lower than the emissions requirement.

In an aspect, a base station may allocate resources for a local operation of a UE, without having received a local operation notification from the UE. In other words, the base station may autonomously determine to allocate resources for a self-calibration of a UE. In one aspect, the base station may periodically allocate resources for a local operation of a UE. For example, the base station may allocate certain uplink resources specifically for the purpose of the local operation of the UE and not allocate such resources for other purposes.

Figure 5:
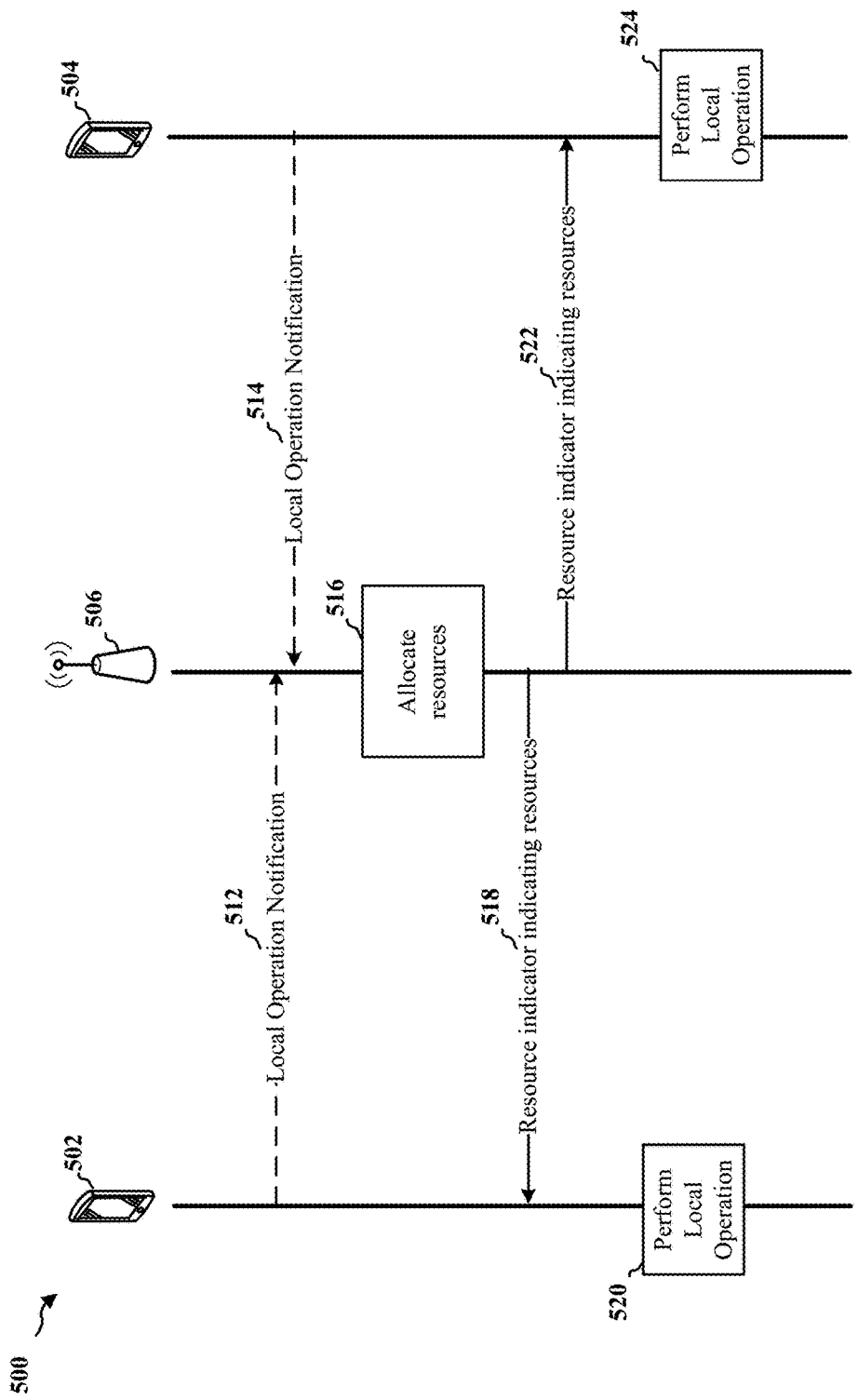
FIG. 5 is an example diagram illustrating local operations of one or more user equipments by coordination between a base station and the one or more user equipments, according to an aspect of the disclosure.

FIG. 5 is an example diagram 500 illustrating local operations of one or more user equipments with coordination between a base station and the one or more user equipments, according to an aspect of the disclosure. The example diagram 500 illustrates coordination between UEs (a first UE 502 and a second UE 504) and a base station 506. At 512, the first UE 502 may transmit a local operation notification to the base station 506. In an aspect, the local operation notification from the first UE 502 may be a self-calibration notification or a transmission blockage detection notification. At 514, the second UE 704 may transmit a local operation notification to the base station 506. In an aspect, the local operation notification from the second UE 704 may be a self-calibration notification or a transmission blockage detection notification. At 516, the base station 506 may allocate resources for a local operation (e.g., self-calibration, transmission blockage detection, etc.) by the UEs, by clearing out the allocated resources. In an aspect, the base station 506 may allocate resources for the local operation (e.g., self-calibration, transmission blockage detection, etc.) by the UEs after gathering local operation notifications from the UEs (e.g., the first UE 502 and the second UE 504) (e.g., during a time duration for gathering local operation notifications). The base station 506 may allocate different resources for different UEs (e.g., each UE may be allocated distinct resources, UEs far from each other may be allocated the same resources), to avoid interference between the UEs. At 518, the base station 506 may transmit, to the first UE 502, a resource indicator indicating allocated resources for use by the UE 502 during a local operation. Based on the resource indicator, at 520, the first UE 502 may perform a local operation (e.g., self-calibration, transmission blockage detection, etc.) using the allocated resources indicated in the received resource indicator. At 522, the base station 506 may transmit, to the second UE 504, a resource indicator indicating allocated resources for use by the second UE 504 during a local operation. The allocated resources for use by the first UE 502 may be different from the allocated resources for use by the second UE 504. Based on the resource indicator, at 524, the second UE 504 may perform a local operation (e.g., self-calibration, transmission blockage detection, etc.) using the allocated resources indicated in the received resource indicator.

The resource allocation of local operation resources by the base station may be performed based on at least one of various approaches. In an aspect, the resource allocation of local operation resources may be based on system-wide resource allocation and/or cluster-wide resource allocation. When the system-wide resource allocation of local operation resources is used, the base station may allocate resources for an entire coverage area of the system, such that the allocated resources may be shared by multiple UEs for local operations. Thus, according to the system-wide resource allocation, the base station may allocate the resources such that each UE within the coverage area is allocated distinct resources. When the cluster-wide resource allocation of local operation resources is used, the base station may allocate resources based on groups or clusters of UEs. In other words, according to the cluster-wide resource allocation, particular resources may be allocated to a specific UE or to a cluster of specific UEs. In an aspect of the cluster-wide resource allocation, if UEs are in the same group, the base station may allocate resources to the UEs in the same group such that the UEs in the same group are not allocated the same resources, to avoid interference between the UEs in the same group. For example, UEs within in the same group may imply that such UEs are likely to cause inter-UE interference to each other if the same resources are used by the UEs in the same group. In one example, UEs in the same group may be within close proximity to each other, and thus may be likely to cause interference with each other if the same resources for the local operation are used by the UEs in the same group. On the other hand, UEs that are distant from each other may be allocated the same local operation resources because the UEs distant from each other may not cause inter-UE interference to each other due to the distance between the UEs. Thus, in this aspect of the cluster-wide resource allocation, for example, two UEs in the coverage area may be allocated the same resources if the two UEs are distant from each other. The UEs that are distant from each other may be UEs in different groups and thus may not be in the same group.

In an aspect, the base station may associate a UE with a respective group based on a directional beam (e.g., directional beam formed by beam-forming) of the base station used for communication with the UE. For example, the base station may partition an angular area into multiple sectors, and may group UEs based on the sectors. The base station may be at the center of the angular area. In one example, the base station may partition a coverage area spanning 360 degrees into 8 sectors, each sector covering 45 degrees. If the base station determines that reception signal strength for UEs is highest in a sector corresponding to a particular directional beam of the base station, the base station may group such UEs in the same sector together in a same group. In an aspect, if the UEs are in the same group, the base station may allocate resources for the UEs such that each UE in the group is allocated different resources for a local operation. In an aspect, the base station may determine whether to allocate different resources for UEs in the same group based on a UE's interference range. In an aspect, in a case where two UEs are respectively located in two different sectors, if the two different sectors are adjacent to each other, the base station may determine that the UEs are not sufficiently distant from each other and thus may allocate different resources to each of the UEs. For example, if a first UE in a first sector and a second UE in a second sector are located near a boundary between the first sector and the second sector, the first UE and the second UE may be located close to each other. In an aspect, in a case where two UEs are respectively located in two different sectors, if the two sectors are not adjacent to each other, the base station may determine that the two UEs are sufficiently distant from each other and thus may allocate the same resources to the two UEs.

In an aspect, if a base station can determine location information of different UEs that are transmitting local operation notifications, the base station may use the location information of the UEs to form groups of UEs based on regions occupied by respective UEs. The location information of the UEs may be provided to the base station by respective UEs. Each UE may determine and report location information based on a location sensor such as a global positioning system (GPS) device within the UE. Alternatively, the base station may determine location information of a UE using time difference of arrival (TDOA) based positioning methods, etc. In an example, the base station may define various regions around the base station, and may determine in which region each UE is located. If UEs are in the same region, the UEs may not utilize the same resources to perform a local operation and may be allocated different resources. For example, if a first UE and a second UE are in the same region, the base station may allocate a first set of resources for the first UE to perform a local operation and may allocate a second set of resources for the second UE to perform a local operation, where the first set of resources are different from the second set of resources. In an aspect, the base station may send a first resource indicator indicating the first set of resources to the first UE and may send a second resource indicator indicating the second set of resources to the second UE. On the other hand, if the base station determines that a first UE is in a first region, and a second UE is in a second region distant from the first region (e.g., at least two regions away from the first region), the first UE and the second UE may be allocated the same resources to perform a local operation because the first UE and the second UE may be sufficiently distant from each other and thus may not interfere with each other when performing a local operation using the same resources. In such a case, the base station may send a resource indicator indicating the same resources for a local operation to each of the first UE and the second UE. Thus, the base station may allocate the same resources for certain UEs that are located in different regions, which may improve overall efficiency of the resource allocation without increasing inter-UE interference.

In an aspect, the resource allocation may be based on a UE's interference range. In particular, a signal strength of a UE may be used to determine an interference range of the UE. For example, a greater signal strength of a UE may result in a larger interference range of the UE. If an interference range of a first UE is within an interference range of a second UE (e.g., overlapping at least in part with the interference range of the second UE), an inter-UE interference may be expected if the same resources are used by the UEs for a local operation. Thus, if the base station determines that an interference range of a first UE is within an interference range of a second UE, the base station may allocate first resources to the first UE and second resources to the second UE for a local operation, where the first resources are different from the second resources.

Figure 6:
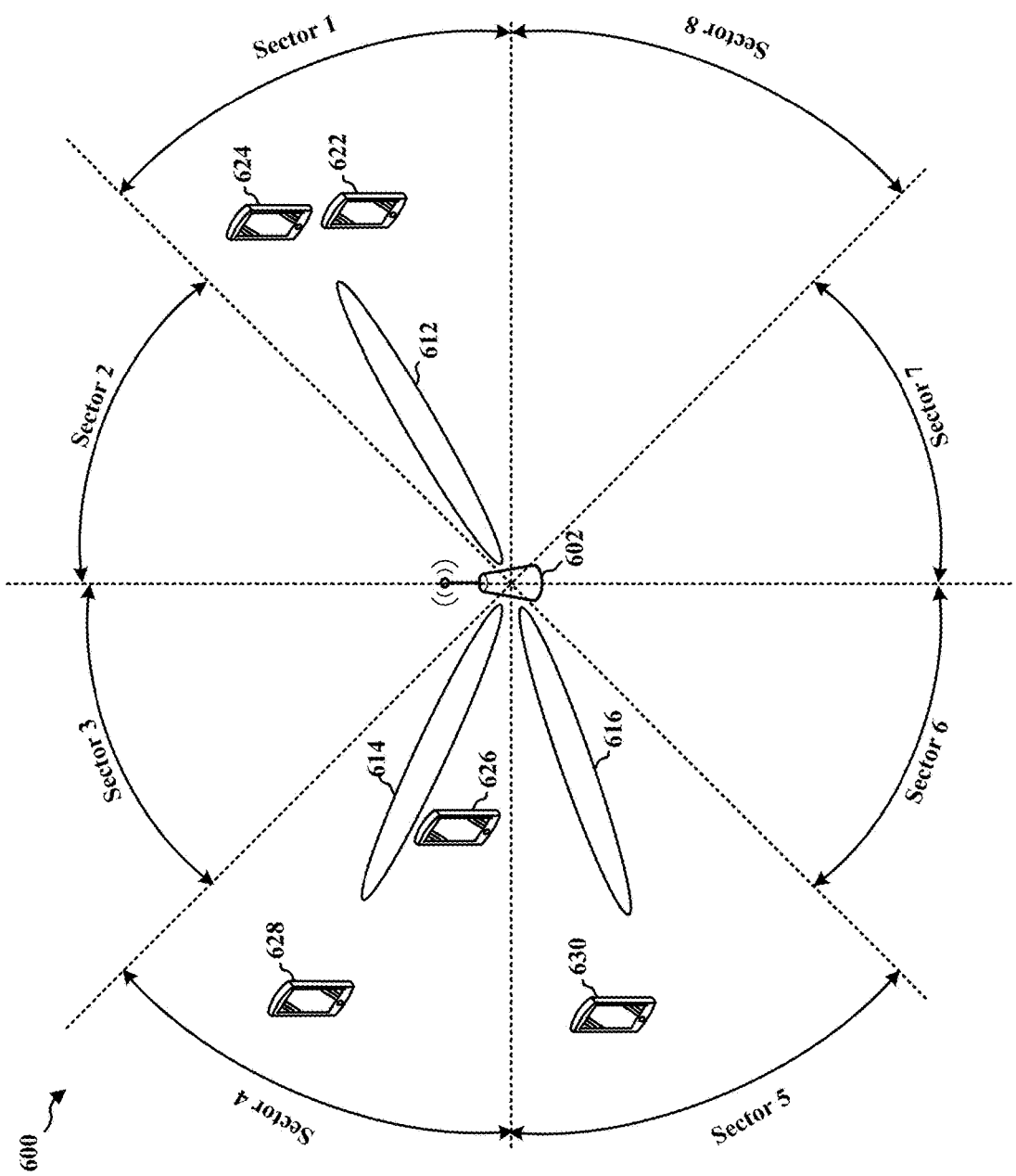
FIG. 6 is an example diagram illustrating grouping of multiple UEs for resource allocation, according to an aspect of the disclosure.

FIG. 6 is an example diagram 600 illustrating grouping of multiple UEs for resource allocation, according to an aspect of the disclosure. In the example diagram 600, a base station 602 may communicate with a first UE 622, a second UE 624, a third UE 626, a fourth UE 628, and a fifth UE 640. In the example diagram 600, the angular region surrounding the base station 602 is divided into eight sectors, each sector covering 45 degrees. A first directional beam 612 of the base station 602 corresponds to Sector 1, and a second directional beam 614 of the base station 602 corresponds to Sector 4. A third directional beam 616 of the base station 602 corresponds to Sector 5. The first directional beam 612, the second directional beam 614, and the third directional beam 616 may be used for transmission and/or reception. The base station 602 determines that a reception signal strength for the first UE 622 and a reception signal strength for the second UE 624 are the strongest with a first directional beam 612. Hence, the base station 602 determines that the first UE 622 and the second UE 624 are in Sector 1 and thus should be grouped together in the same group corresponding to Sector 1. Because the first UE 622 and the second UE 624 are in the same group, the base station 602 allocates resources such that resources allocated to the first UE 622 are different from resources allocated to the second UE 624. The base station 602 determines that a reception signal strength for the third UE 626 and a reception signal strength for the fourth UE 628 are the strongest for a second directional beam 614, and thus the base station 602 determines that the third UE 626 and the fourth UE 628 are in the same group corresponding to Sector 4. Because the third UE 626 and the fourth UE 628 are in the same group, the base station 602 allocates resources such that resources allocated to the third UE 626 are different from resources allocated to the fourth UE 628.

In an aspect, the base station 602 may allocate the same resources for a local operation for one of the UEs 622 and 624 in Sector 1 and for one of the UEs 626 and 628 in Sector 4 because Sector 1 and Sector 4 are facing opposite directions from the base station 602 and thus one of the UEs 622 and 624 in Sector 1 and one of the UEs 626 and 628 in Sector 4 are not likely to interfere with each other if the same resources are assigned for a local operation. However, in one aspect, the base station 602 may allocate resources such that none of the resources assigned to the UEs 626 and 628 in Sector 4 are assigned to the fifth UE 630 in Sector 5 because the fifth UE 630 is in Sector 5 adjacent to Sector 4 and the base station 602 may determine that UEs in adjacent sectors are likely to interfere with each other if the same resources are assigned for a local operation in sectors 4 and 5.

Figure 7:
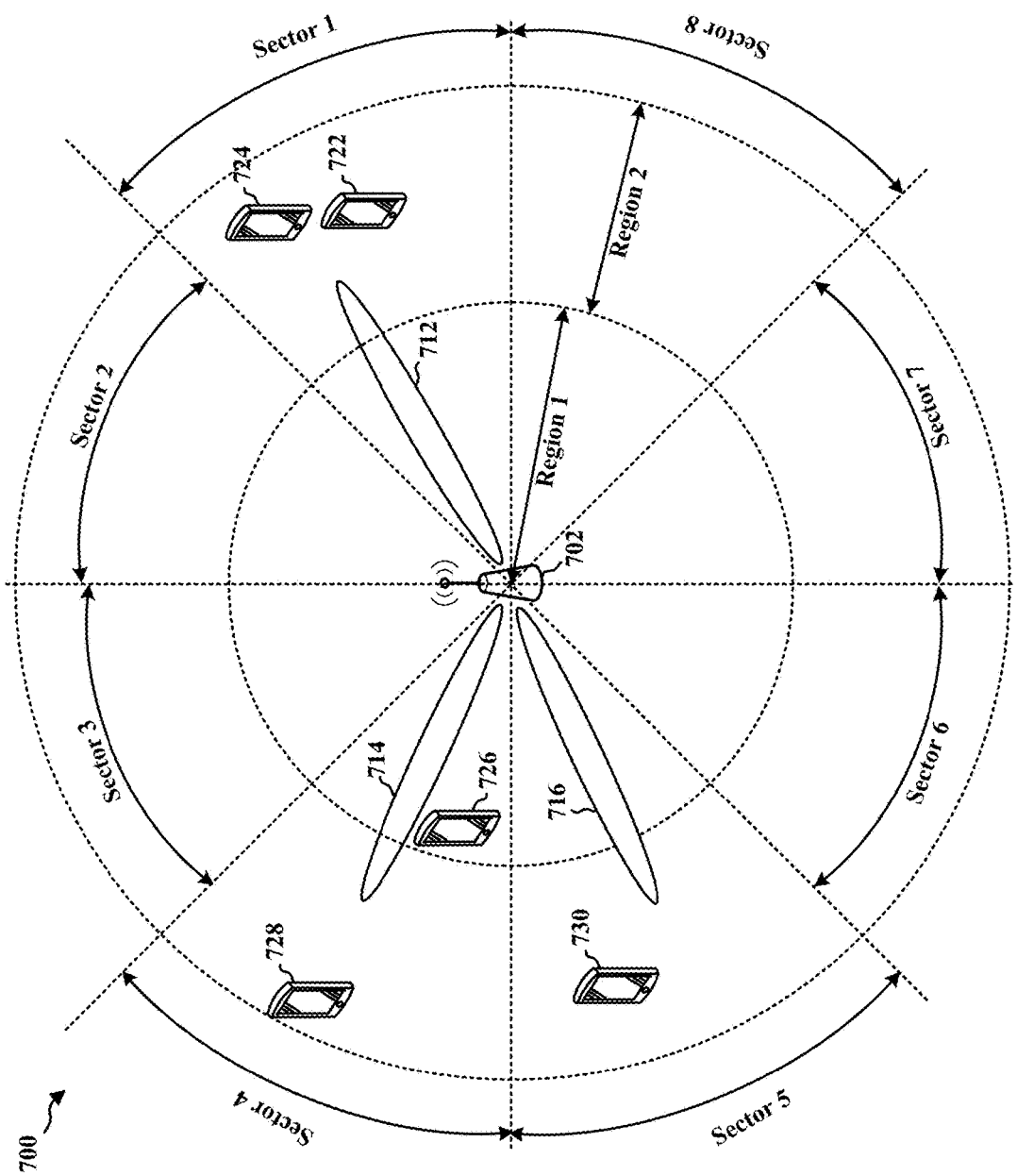
FIG. 7 is an example diagram illustrating grouping of multiple UEs for resource allocation when locations of user equipments are known, according to an aspect of the disclosure.

FIG. 7 is an example diagram 700 illustrating grouping of multiple UEs for resource allocation when locations of user equipments are known, according to an aspect of the disclosure. In the example diagram 700, a base station 702 may communicate with a first UE 722, a second UE 724, a third UE 726, a fourth UE 728, and a fifth UE 730. In the example diagram 700, the angular region surrounding the base station 702 is divided into eight sectors, each sector covering 45 degrees, and the eight sectors are further divided into regions (e.g., Region 1 and Region 2) based on a distance from the base station 702. Because locations of the UEs are known in the example diagram 700, the angular region may be further divided into regions based on the distance from the base station 702. A first directional beam 712 of the base station 702 corresponds to Sector 1, and a second directional beam 714 of the base station 702 corresponds to Sector 4. The base station 702 determines that a reception signal strength for the first UE 722 and a reception signal strength for the second UE 724 are the strongest with a first directional beam 712. Because the base station 702 knows the locations of the UEs (e.g., relative location with respect to a location of the base station 702), the base station 702 may determine that the first UE 722 and the second UE 724 are in Sector 1, Region 2, and thus are assigned to the same group. Because the first UE 722 and the second UE 724 are in the same group, the base station 702 allocates local operation resources such that the local operation resources allocated to the first UE 722 are different from the local operation resources allocated to the second UE 724.

In addition, the base station 702 may determine that a reception signal strength for the third UE 726 and a reception signal strength for the fourth UE 728 are the strongest for a second directional beam 714. The base station 702 determines that a reception signal strength for the fifth UE 730 is the strongest for a third beam 716. With the location information of the UEs, the base station determines that a third UE 726 is in Sector 4, Region 1, and that a fourth UE 728 is in Sector 4, Region 2. The base station 702 also determines that a fifth UE 730 is in Sector 5, Region 2. Although the third UE 726 and the fourth UE 728 are in different regions, the base station 702 may not allocate the same local operation resources because the third UE 726 and the fourth UE 728 are located in adjacent regions. The third UE 726 and the fifth UE 730 are in different, non-adjacent regions, and thus the base station 702 may allocate the same local operation resources to the third UE 726 and the fifth UE 730. Further, since each of the third UE 726, the fourth UE 728, and the fifth UE 730 is in a different, non-adjacent region from the first UE 722, the base station may allocate the same local operation resources to the first UE 722 and one of the third UE 726, the fourth UE 728, and the fifth UE 730.

Figure 8:
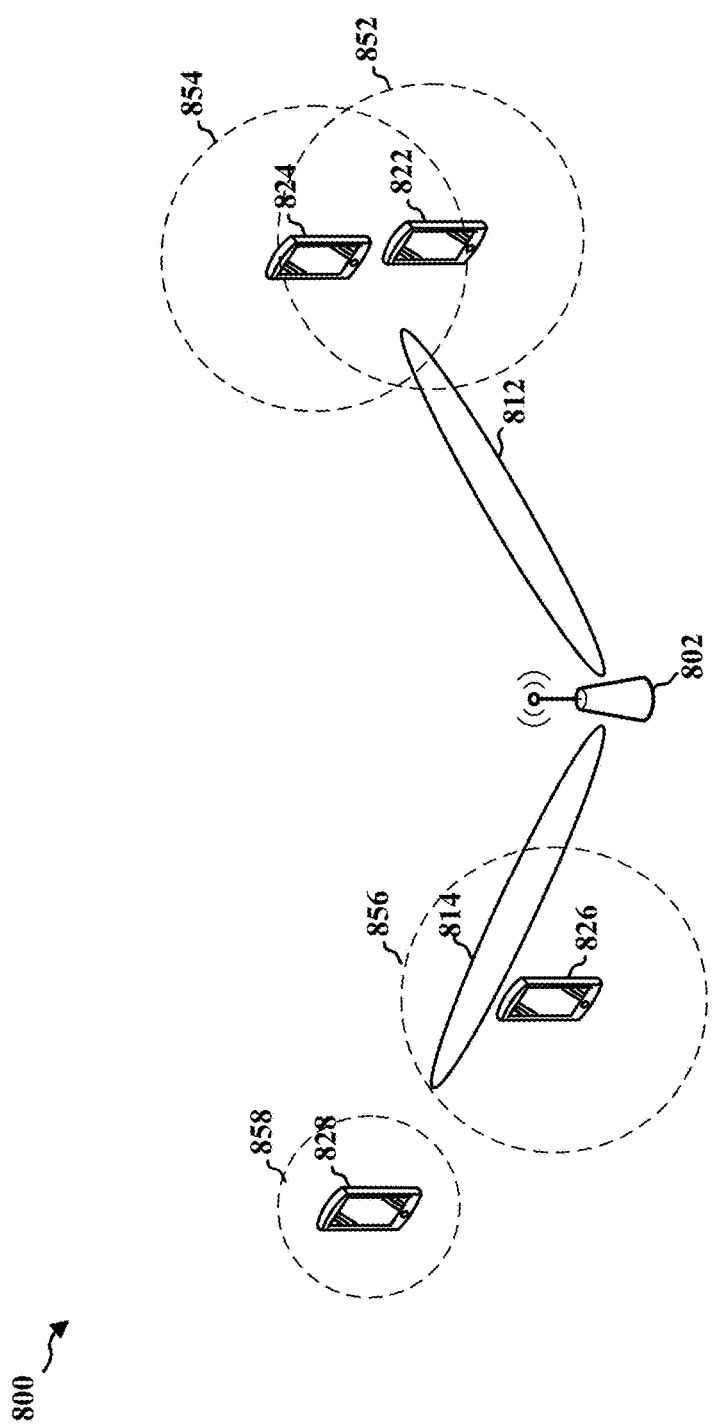
FIG. 8 is an example diagram illustrating resource allocation for UEs based on interference zones, according to an aspect of the disclosure.

FIG. 8 is an example diagram 800 illustrating resource allocation for UEs based on interference zones, according to an aspect of the disclosure. A base station 802 coordinates with a first UE 822 and a second UE 824 to allocate resources for a local operation. In the example diagram 800, the first UE 822 and the second UE 824 are facing the directional beam 812 of the base station 802. An interference zone 852 of the first UE 822 overlaps with an interference zone 854 of the second UE 824, and thus the base station 802 may not allocate the same resources for a local operation to the first UE 822 and the second UE 824, and may allocate different resources. The base station 802 may estimate a size of the interference zone 852 based on the signal strength of the first UE 822 and may estimate a size of the interference zone 854 based on the signal strength of the second UE 824. The signal strength may be measured by a signal-to-noise ratio. In one example, the interference zone of a UE may be a circular area surrounding the UE, with a certain diameter. In the example diagram 800, the third UE 826 and the fourth UE 828 are facing the directional beam 814 of the base station 802. An interference zone 856 of the third UE 826 does not overlap with an interference zone 858 of the fourth UE 828, and thus the base station 802 may allocate the same resources for a local operation to the third UE 826 and the fourth UE 828.

In an aspect, a base station may allocate multiple resources to a single UE, which may utilize the multiple resources in various ways. In an aspect, when a UE is allocated with multiple resources (e.g., multiple transmit resources), the UE may transmit a reference signal for a local operation using one or more of the allocated resources at a time. For example, the UE may utilize one or two of the allocated resources to transmit a reference signal based on a predefined pattern. The predefined pattern may be a round-robin pattern, where the UE utilizes one source at a time per transmission of a reference signal in a round-robin manner. For example, if N resources are allocated, the UE may utilize resource #1 for a first transmission of the reference signal, resource #2 for a second transmission of the reference signal, and resource #N for an Nth transmission of the reference signal. The UE may utilize resource #1 again after utilizing resource #N. In another aspect, when a UE is allocated with multiple transmit resources, the UE may simultaneously use multiple TX elements that utilize the multiple transmit resources, to form specific beam patterns for a local operation using beam-forming. In one example, the base station may provide the predefined pattern to the UE.

In an aspect, the base station may allocate a number of resources sufficient to cover an amount of time needed for a UE to perform a local operation. For example, if a UE needs less than 1 millisecond to perform a local operation, the base station may allocate one subframe, where each subframe is 1 millisecond long. In another example, if a UE needs more than 1 millisecond (e.g., 1.5 milliseconds) to perform a local operation, the base station may allocate two subframes of resources. The number of resources to perform the local operation may be conveyed to the base station from the UE via a resource request, as discussed more in detail below. If a UE has multiple antenna elements that are to be used for a local operation, an amount of time needed for the UE to perform a local operation may depend on the number of antenna elements. For example, a UE may send a reference signal using each of the multiple antenna elements. Thus, if the UE has N antenna elements, a total number of resources allocated by the base station may be N times the basic unit of resource for calibration. For example, if each of N antenna elements needs less than 1 millisecond (e.g., 100-200 microseconds) to perform transmission of the reference signal, the basic unit of resource for the local operation may be one subframe, and thus the total number of resources may be N antenna elements×1 subframe per antenna element=N subframes. In another example, if each of N antenna elements needs more than 1 millisecond (e.g., 1.5 milliseconds) to perform transmission, the basic unit of resource for the local operation may be two subframes, and thus the total number of resources may be N antenna elements×2 subframes per antenna element =2N subframes.

The UE may transmit, to the base station, a resource request indicating an amount of resources (e.g., time duration) needed for the UE to perform a local operation. In an aspect, the resource request may indicate a request for a certain amount of resources, based on the amount of resources (e.g., time duration) needed for the UE to perform a local operation. Thus, when the base station generates and sends to the UE the resource indicator indicating the allocated resources to the UE, the resource indicator may be based on the resource request. In an aspect, the base station may receive the resource request, and estimate a number of resources to allocate to the UE based on the amount of resources (e.g., time) indicated in the resource request. The resource request may also include a number of antenna elements of the UE. In an aspect, the resource request may be included in the local operation notification transmitted to the base station.

In an aspect, if the UE needs more resources (e.g., a longer time for the local operation), more than the amount of resources the UE requested initially via the resource request, UE may send an additional resource request to the base station. The additional resource request may indicate an additional amount of resources (e.g., additional time) needed for the UE to perform a local operation. In an aspect, the additional resource request may indicate a request for a certain amount of resources, based on the additional amount of resources (e.g., additional time) needed for the UE to complete a local operation. In an aspect, the base station may receive the additional resource request, and estimate a number of resources to additionally allocate for the local operation based on the amount of resources indicated in the additional resource request.

In an aspect, a UE's local operation may not utilize all of the local operation resources indicated in the resource indicator. Then, the base station may use the remaining portion of the allocated resources for other types of operations, where the remaining portion of the allocated resources is a portion that is not utilized for a local operation. For example, if the UE's local operation needs a narrow bandwidth for a local operation using a reference signal, there may be remaining portions of the bandwidth that is not used for a local operation and thus may be used for other operations. In one example, if the UE is utilizing a 5 MHz reference signal and the carrier in the allocated resources is 100 MHz wide, then the UE may utilize approximately 15 MHz (including the guard bands) of the bandwidth, and the remaining 85 MHz may be used to schedule operations by other UEs. The UE may transmit an remaining resource indicator to the base station, indicating the remaining portion of the allocated resources.

In an aspect, the base station may allocate several component carriers (CCs) as resources for a UE's local operation. If the UE uses a portion of the several CCs for the UE's local operation, the base station may use the remaining portion of the several CCs not used for a local operation for other operations, where the remaining portion is not used for the UE's local operation. If the UE uses a portion of a first CC (e.g., one or more subcarriers within the CC) for the UE's local operation, the base station may use the remaining CCs and the unused subcarriers of the first CC. For example, if each CC is 100 MHz and four CCs are allocated, then a UE may use one of the CCs for a local operation and the other three CCs may be available for other uses. Within the one of the CCs used for local operation, the UE may use some subcarriers for a local operation and the remaining subcarriers not used for a local operation may be available for other uses.

In one example where a reference signal for the local operation is sent via RACH signaling, if the bandwidth of a CC is 100 MHz, a UE may utilize 15 MHz for a local operation and thus the base station may allocate the remaining 85 MHz of the bandwidth of the CC to RACH signaling, such that other UEs that are not yet connected to a base station may use the remaining 85 MHz to send a RACH signal to connect to the base station. In such an example, the base station may not receive and/or may not process any RACH signals communicated in the first 15 MHz bandwidth that is allocated for the local operation of the UE, to avoid interference with the UE's local operation. In another example, if N is a number of CCs in a CA system, a first CC may be allocated for a local operation and the remaining CCs may be allocated for RACH signaling. The base station may advertise information about available CCs for RACH signaling in a SIB when the base station operates in a CA mode.

According to another aspect of the disclosure, a base station may initiate self-calibration of the base station by allocating resources for self-calibration of the base station. The base station may allocate the resources by clearing out the resources for the self-calibration of the base station. For example, the base station may clear out (e.g., free up) resources by allocating the resources to the base station for self-calibration and not allocating the same resources to any other devices for other purposes. When the base station determines to perform self-calibration of the base station, the base station may notify a UE that the base station will perform self-calibration by transmitting a self-calibration notification to the UE. The self-calibration notification may indicate a self-calibration to be performed by the base station. The self-calibration notification may include an indication to a UE to indicate the allocated resources for self-calibration of the base station. Subsequently, the base station performs self-calibration using the allocated resources. When the UE receives the self-calibration notification from the base station, the UE may determine to deactivate at least a component of the UE and/or may refrain from utilizing the allocated resources based on the allocated resources for self-calibration of the base station, such that the UE's signaling may not interfere with the self-calibration of the base station using the allocated resources. In an aspect, the UE may enter a sleep mode or may be deactivated during a time period corresponding to the allocated resources for self-calibration of the base station, and may wake up after the time period is over.

In an aspect, the base station may notify neighboring base stations that the base station will perform self-calibration by transmitting a self-calibration notification to the neighboring base stations. Subsequently, the base station performs self-calibration using the allocated resources. When a neighboring base station receives the self-calibration notification from the base station, the neighboring base station may adjust how the resources allocated to the base station for self-calibration may be used. In an aspect, the neighboring base station may clear out the resources allocated to the base station for self-calibration. In particular, the neighboring base station may clear out resources by refraining from utilizing the resources allocated for the self-calibration of the base station for communication by the neighboring base station. For a UE that is served by the neighboring base station and is within a communication range of the base station, the reference signal transmitted by the base station for self-calibration may be interfered by the communication by the UE that utilizes the resources allocated for the self-calibration of the base station. Thus, in an aspect, the neighboring base station may avoid assigning the resources allocated to the base station for self-calibration to a UE that is served by the neighboring base station and is within a communication range of the base station. In an aspect, the neighboring base station may not avoid assigning the resources allocated to the base station for self-calibration to a UE that is served by the neighboring base station and is outside the communication range of the base station. When the allocated resources are cleared out for self-calibration of the base station, the base station may perform self-calibration using the allocated resources with little or no interference in the allocated resources from the neighboring base station.

In an aspect, the base station may send a resource allocation indication to the neighboring base stations to indicate the resources allocated for self-calibration of the base station, such that the neighboring base stations may be informed of the resources allocated for self-calibration of the base station. In an aspect, the neighboring base station may adjust utilization of the resources allocated for self-calibration of the base station (e.g., by refraining from utilizing the allocated resources) during a time period corresponding to the allocated resources for self-calibration of the base station, and may utilize the allocated resources when the time period is over. During self-calibration of the base station, the base station may transmit (e.g., in the TX chain) a reference signal using the allocated resources indicated in the grant/resource indicator. The base station may use the RX chain to measure certain parameters from the transmitted reference signal received by the RX chain. In an aspect, the base station may measure the parameters of the reference signal in frequencies corresponding to the allocated resources.

In an aspect, the base station may perform self-calibration based on the measured parameters of the reference signal and on standard parameters of the reference signal, where the standard parameters may be ideal parameters without error or interference. For example, during the self-calibration, the base station may compare the measured parameters with the standard parameters, and calibrate the base station according to the comparison (e.g., by calibrating the base station to have the measured parameters match closely with the standard parameters, within certain error tolerances). The parameters may include an amplitude and/or a phase. Thus, for example, the base station may measure an amplitude and a phase received by the RX chain of the transmitted reference signal, and compare the measured amplitude and the measured phase with a standard amplitude and a standard phase, respectively, to calibrate the base station. In an aspect, the reference signal may include at least one of a demodulation reference signal, a sounding reference signal, or a newly-defined calibration reference signal that may be used for calibration.

In an aspect, a base station may allocate multiple resources for self-calibration of the base station, and may utilize the multiple resources in various ways. In an aspect, when a base station is allocated with multiple resources (e.g., multiple transmit resources), the base station may transmit a reference signal for self-calibration using one or more of the allocated resources at a time. For example, the base station may utilize one or more of the allocated resources to transmit a reference signal based on a predefined pattern. The predefined pattern may be a round-robin pattern, where the base station utilizes one source at a time per transmission of a reference signal in a round-robin manner. For example, if N resources are allocated for calibration of the base station, the base station may utilize resource #1 for a first transmission of the reference signal, resource #2 for a second transmission, and resource #N for an Nth transmission. The base station may utilize resource #1 after utilizing resource #N. In another aspect, when a base station is allocated with multiple transmit resources, the base station may simultaneously use multiple TX elements that utilize the multiple transmit resources, to form specific beam patterns for self-calibration using beam-forming.

In an aspect, the base station may allocate a number of resources sufficient to cover an amount of time needed for a base station to perform self-calibration. For example, if the base station needs less than 1 millisecond to perform self-calibration, the base station may allocate one subframe, where each subframe is 1 millisecond long. In another example, if a UE needs more than 1 millisecond (e.g., 1.5 milliseconds) to perform self-calibration, the base station may allocate two subframes of resources. If the base station has multiple antenna elements that are to be used for self-calibration, an amount of time needed for the base station to perform self-calibration may depend on the number of antenna elements. For example, the base station may send a reference signal using each of the multiple antenna elements. Thus, if the base station has N antenna elements, a total number of resources allocated by the base station may be N×a basic unit of resource for calibration. For example, if each of N antenna elements needs less than 1 millisecond (e.g., 100-200 microseconds) to perform transmission, the basic unit of resource for calibration may be one subframe, and thus the total number of resources may be N antenna elements×1 subframe per antenna element=N subframes. In another example, if each of N antenna elements needs more than 1 millisecond (e.g., 1.5 milliseconds) to perform transmission, the basic unit of resource for calibration may be two subframes, and thus the total number of resources may be N antenna elements×2 subframes per antenna element=2N subframes.

In an aspect, if the base station needs more resources (e.g., a longer time) for self-calibration than the allocated resources for self-calibration of the base station indicated to neighboring base stations (e.g., via a resource allocation indication), base station may send an additional resource allocation indication to the neighboring base station. The additional resource allocation indication may indicate additional resources are needed for the base station to complete self-calibration, and may indicate an amount of the additional resources. When the UE served by the base station receives the additional resource allocation indication from the base station, the UE may continue to deactivate the components of the UE for an additional time period corresponding to the additional resources. When a neighboring base station receives the additional resource allocation indication, the neighboring base stations may adjust utilization of resources corresponding to the additional resources for self-calibration of the base station for an additional time period corresponding to the additional resources. For example, the neighboring base station may refraining from utilizing the additional resources for communication by the neighboring base station. For example, the neighboring base station may avoid assigning the additional resources to a UE that is served by the neighboring base station and is within a communication range of the base station.

Figure 9:
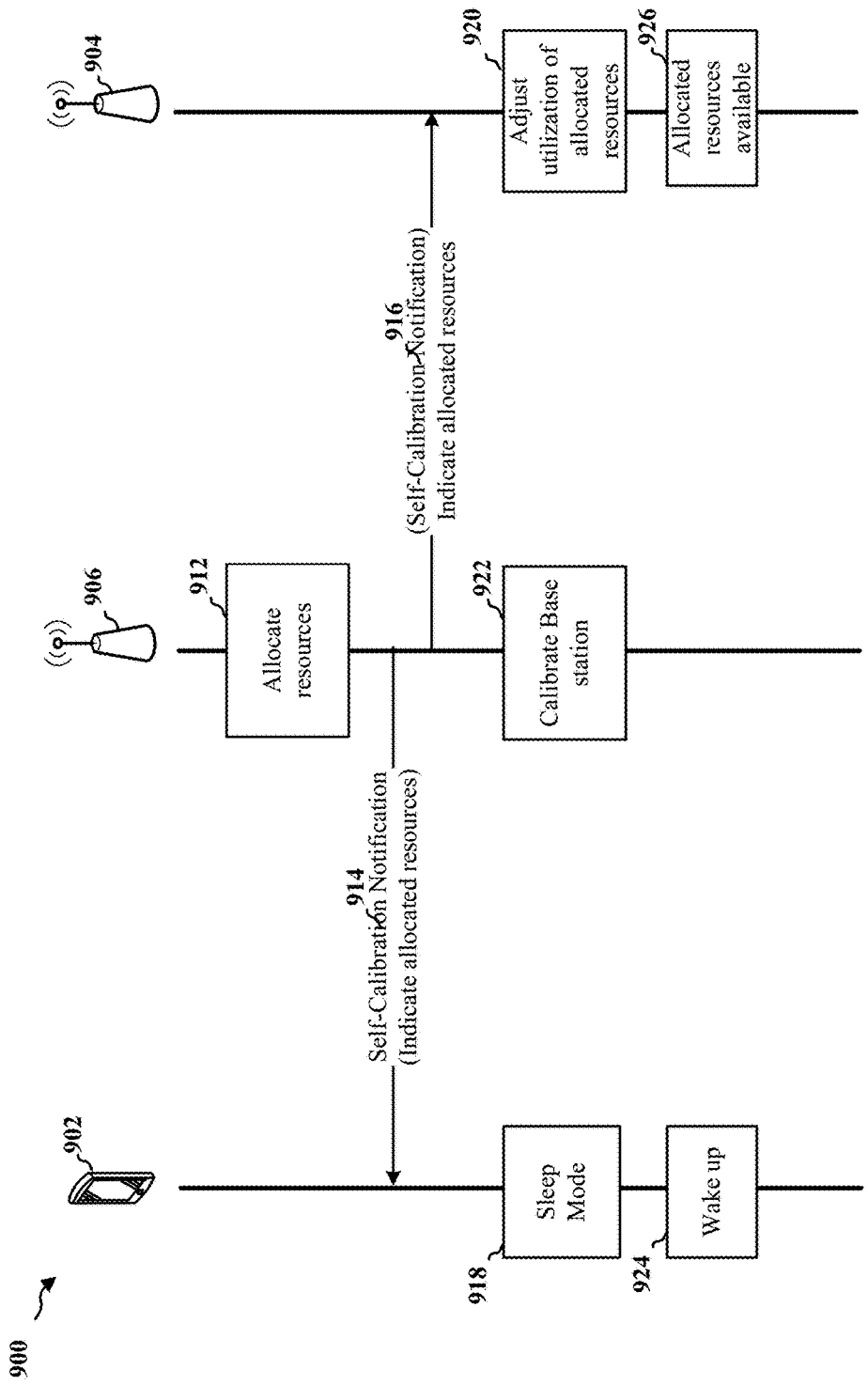
FIG. 9 is an example diagram illustrating self-calibration of a base station by coordination between a base station and devices, according to an aspect of the disclosure.

FIG. 9 is an example diagram 900 illustrating self-calibration of a base station by coordination between a base station and devices, according to an aspect of the disclosure. The example diagram 900 illustrates coordination between a UE 902 and a base station 906 and coordination between a neighboring base station 904 and the base station 906. At 912, the base station 906 may allocate resources for self-calibration of the base station 906 by clearing out the allocated resources. At 914, the base station 906 may transmit, to the UE 902, a self-calibration notification including an indication indicating the allocated resources for self-calibration of the base station 906. At 916, the base station 906 may transmit, to the neighboring base station 904, a self-calibration notification including an indication indicating the allocated resources for self-calibration of the base station 906. In response to the self-calibration notification, the UE 902 may enter a sleep mode at 918 and the neighboring base station 904 may adjust utilization of the allocated resources at 920, during the time period when the base station performs self-calibration of the base station 906 at 922. In one example, at 920, the base station 904 may refrain from granting the allocated resources to one or more UEs served by the base station 904, especially if the one or more UEs are within a communication range of the base station 906. In one example, at 920, the base station 904 may refrain from utilizing the allocated resources for communication of the base station 904. After the time period for self-calibration is over, the UE 902 wakes up at 924 and the neighboring base station 904 determines that the allocated resources are available for use at 926. For example, the UE 902 and the neighboring base station 904 may determine the time period for self-calibration based on the allocated resources for self-calibration.

In an aspect, if a base station can determine location information of devices (e.g., UEs and/or neighboring base stations), the base station may utilize the location information of the devices to determine whether to transmit the self-calibration notification to each device. The location information of the devices may be provided to the base station by the respective devices. Each device may determine the device's location based on a location sensor such as a GPS device and report the location information to the base station, and/or a base station may determine device locations using TDOA based positioning methods, etc. In one example, if a device is located in a region corresponding to a direction of base station's beam that is used for self-calibration, the base station may determine to transmit the self-calibration notification to the device. On the other hand, if a device is not located in the region corresponding to the direction of the base station's beam that is used for self-calibration, then the base station may refrain from transmitting the self-calibration notification to the device. In such a case, if the device is not located in the region corresponding to the direction of the base station's beam, the device may not interfere with the self-calibration of the base station even if the device utilizes the resources allocated for the self-calibration of the base station. Therefore, in such a case, the self-calibration notification may not be necessary.

Figure 10:
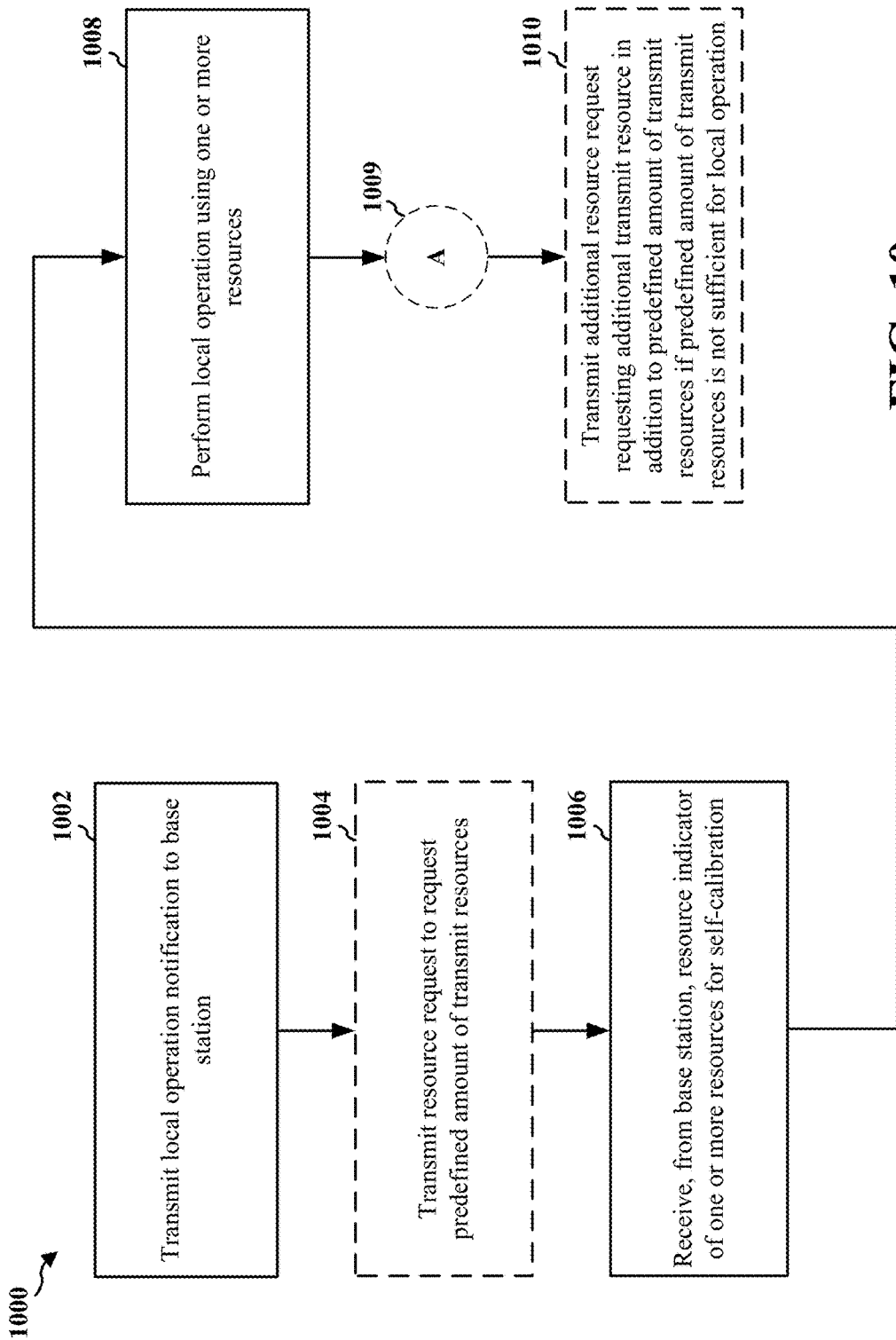
FIG. 10 is a flowchart of a method of wireless communication, according to an aspect of the disclosure.

FIG. 10 is a flowchart 1000 of a method of wireless communication. The method may be performed by a UE (e.g., the UE 104, 502, 504, the apparatus 1602/1602'). At 1002, the UE transmits a local operation notification to a base station, the local operation notification indicating a local operation that is local to the UE. In an aspect, the local operation notification may be transmitted via at least one of a MAC control element or physical layer signaling. For example, as discussed supra, a UE (or a CPE) notifies a base station serving the UE that the UE will perform a local operation of the UE by transmitting a local operation notification to the base station. For example, as discussed supra, the local operation notification may be transmitted via at least one of a MAC control element or physical layer signaling (e.g., layer-1 signaling). For example, as discussed supra, the local operation notification may indicate a local operation to be performed by the UE.

At 1004, the UE may transmit a resource request to request a predefined amount of transmit resources. For example, as discussed supra, the resource request may indicate a request for a certain amount of resources, based on the amount of time needed for the UE to perform a local operation. In an aspect, the resource request may be included in the local operation notification. For example, as discussed supra, the resource request may be included in the local operation notification transmitted to the base station. In an aspect, the resource request may include a number of antenna elements of the UE. For example, as discussed supra, the resource request may also include a number of antenna elements of the UE.

At 1006, the UE may receive, from the base station, a resource indicator indicating one or more resources for the local operation. For example, as discussed supra, the UE receives a resource indicator indicating the allocated resources from the base station. In an aspect, the resource indicator may be received via DCI. For example, as discussed supra, the base station may send the resource indicator via a control channel such as a PDCCH and/or via DCI. In an aspect, the resource indicator may be based on the resource request. For example, as discussed supra, when the base station generates and sends to the UE the resource indicator indicating the allocated resources to the UE, the resource indicator may be based on the resource request.

In an aspect, the one or more resources may include a plurality of transmit resources, and the plurality of transmit resources may be used to form one or more beam patterns for performing the local operation. For example, as discussed supra, in an aspect, when a UE is allocated with multiple resources (e.g., multiple transmit resources), the UE may transmit a reference signal for the local operation using one or more of the allocated transmit resources at a time. For example, as discussed supra, the UE may utilize one or more of the allocated transmit resources to transmit a reference signal based on a predefined pattern. For example, as discussed supra, in another aspect, when a UE is allocated with multiple transmit resources, the UE may simultaneously use multiple TX elements that utilize the multiple transmit resources, to form specific beam patterns for the local operation using beam-forming.

At 1008, the UE performs the local operation using the one or more resources. For example, as discussed supra, when the UE receives the resource indicator indicating the allocated resources, the UE may utilize the allocated resources to perform the local operation based on the resource indicator.

In an aspect, the UE may perform the local operation by: transmitting a reference signal using the one or more resources, determining one or more parameters based on the transmitted reference signal, performing the local operation based on the determined one or more parameters.

In an aspect, the local operation may be self-calibration of the UE. In such an aspect, the UE may determine the one or more parameters by measuring the one or more parameters from the transmitted reference signal, where the local operation may be performed based on the one or more parameters and based on one or more standard parameters. In such an aspect, the one or more parameters may include at least one of an amplitude or a phase. For example, as discussed supra, to perform self-calibration, the UE may transmit (e.g., in the TX chain) a reference signal using the allocated resources indicated in the resource indicator. Subsequently, for example, as discussed supra, the UE may use the RX chain to measure certain parameters of the reference signal received by the RX chain. For example, as discussed supra, the UE may perform self-calibration based on the measured parameters of the reference signal and based on standard parameters of the reference signal, where the standard parameters may be ideal parameters without error or interference. For example, as discussed supra, the parameters may include an amplitude and/or a phase. In an aspect, the reference signal may include at least one of a demodulation reference signal, a sounding reference signal or a calibration reference signal used for calibration. For example, as discussed supra, the reference signal may include at least one of a demodulation reference signal, a sounding reference signal, or a newly-defined calibration reference signal that may be used for calibration.

In an aspect, the self-calibration of the UE may be based on a comparison between the measured one or more parameters and the one or more standard parameters. For example, as discussed supra, during the self-calibration, the UE may compare the measured parameters with the standard parameters, and calibrate the UE according to the comparison (e.g., by calibrating the UE to have the measured parameters match closely with the standard parameters). For example, as discussed supra, the UE may measure an amplitude and a phase received by the RX chain of the transmitted reference signal, and compare the measured amplitude and the measured phase with a standard amplitude and a standard phase, respectively, to calibrate the UE.

In an aspect, the local operation may be transmission blockage detection. In such an aspect, the UE may determine the one or more parameters by: receiving a reflected signal of the transmitted reference signal, and determining a signal strength of the reflected signal and a round-trip time of the reference signal based on a time of the transmission of the reference signal and a time of the reception of the reflected signal, where the one or more parameters include the signal strength of the reflected signal and the round-trip time of the reference signal. In such an aspect, the local operation (e.g., the transmission blockage detection) may be performed based on the signal strength of the reflected signal and the round-trip time of the reference signal. In such an aspect, the UE may perform the local operation by: determining whether a transmission path is blocked by an object based on the signal strength of the reflected signal and the round-trip time of the reference signal, and determining a type of object blocking the transmission path based on the signal strength of the reflected signal and the round-trip time of the reference signal if the transmission path is blocked.

Figure 11:
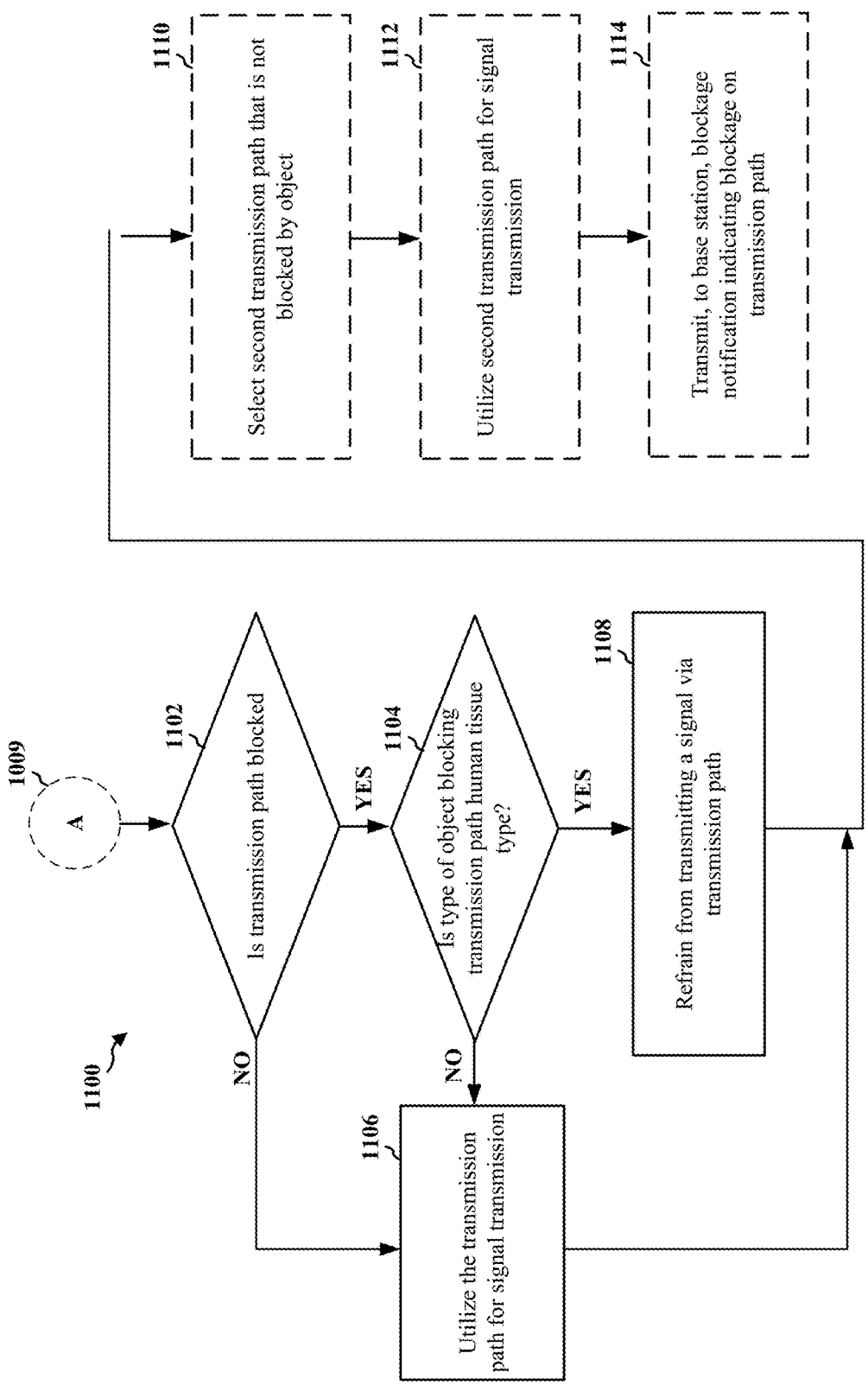
FIG. 11 is a flowchart of a method of wireless communication, expanding from the flowchart of FIG. 10.

At 1009, in a case where the local operation is transmission blockage detection, the UE may additionally perform features described infra in FIG. 11.

In an aspect, the one or more resources may include a plurality of transmit resources, and one or more of the plurality of transmit resources may be each used for transmission of the reference signal based on a predefined pattern. For example, as discussed supra, the UE may utilize one or more of the allocated resources to transmit a reference signal based on the predefined pattern. For example, as discussed supra, the predefined pattern may be a round-robin pattern, where the UE utilizes one source at a time per transmission of a reference signal in a round-robin manner. In such an aspect, the predefined pattern may be received from the base station. For example, as discussed supra, the base station may provide the predefined pattern to the UE.

At 1010, the UE may transmit an additional resource request requesting an additional transmit resource in addition to the predefined amount of transmit resources if the predefined amount of transmit resources is not sufficient for the local operation. For example, as discussed supra, if the UE needs additional resources (e.g., because of a longer time for the local operation), beyond the amount of resources the UE requested initially via the resource request, UE may send an additional resource request to the base station. For example, as discussed supra, the additional resource request may indicate an additional amount of resources (e.g., additional time) needed for the UE to complete local operation.

FIG. 11 is a flowchart 1100 of a method of wireless communication, expanding from the flowchart 1000 of FIG.

10. The method may be performed by a UE (e.g., the UE 104, 502, 504, the apparatus 1602/1602'). At 1009, in a case where the local operation is transmission blockage detection, the UE may continue from the flowchart 1000 of FIG. 10.

At 1102, the UE determines whether the transmission path is blocked. If the transmission path is blocked, at 1104, the UE determines whether the type of the object blocking the transmission path is a human tissue type.

If the transmission path is not blocked or the type of the object blocking the transmission path is not the human tissue type, at 1106, the UE utilizes the transmission path for signal transmission. If the type of the object blocking the transmission path is the human tissue type, at 1108, the UE refrains from transmitting a signal on the transmission path.

In an aspect, at 1110, the UE may select a second transmission path that is not blocked by the object. At 1112, the UE may utilize the second transmission path for signal transmission.

In an aspect, at 1114, the UE may transmit, to the base station, a blockage notification indicating the blockage via the transmission path if the type of the object blocking the transmission path is a human tissue type.

Figure 12:
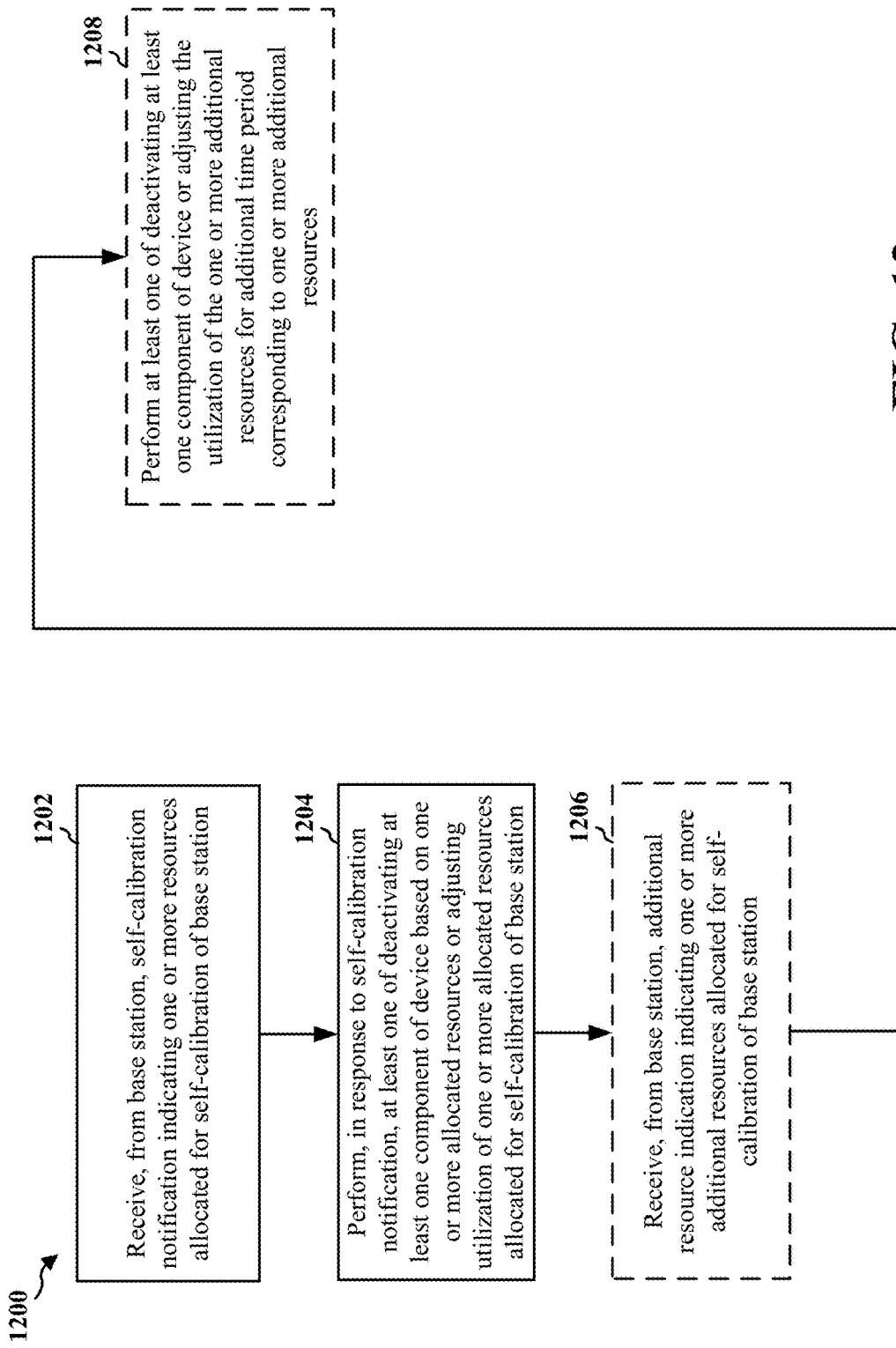
FIG. 12 is a flowchart of a method of wireless communication, according to an aspect of the disclosure.

FIG. 12 is a flowchart 1200 of a method of wireless communication. The method may be performed by a device (e.g., the UE 104, the UE 902, the neighboring base station 904, the apparatus 1602/1602'). In an aspect, the device is a UE or a neighboring base station. At 1202, the device receives, from a base station, a self-calibration notification indicating one or more resources allocated for a self-calibration of the base station. For example, as discussed supra, the base station may notify a UE that the base station will perform self-calibration by transmitting a self-calibration notification to the neighboring base stations. For example, as discussed supra, the base station may notify neighboring base stations that the base station will perform self-calibration by transmitting a self-calibration notification to the neighboring base stations. For example, as discussed supra, the self-calibration notification may indicate a self-calibration to be performed by the base station and may include an indication to indicate the allocated resources for self-calibration of the base station. At 1204, the device performs, in response to the self-calibration notification, at least one of deactivating at least one component of the device based on the one or more allocated resources or adjusting utilization of the one or more allocated resources allocated for the self-calibration of the base station. For example, as discussed supra, when the UE receives the self-calibration notification from the base station, the UE may determine to deactivate at least a component of the UE based on the allocated resources for self-calibration of the base station. For example, as discussed supra, when a neighboring base station receives the self-calibration notification from the base station, then the neighboring base station may adjust how the resources allocated to the base station for self-calibration may be used.

In an aspect, the at least one of the deactivating the at least one component of the device or the adjusting the utilization of the one or more allocated resources is performed during a time period corresponding to the one or more allocated resources. In such an aspect, the device may deactivate the at least one component of the device by entering a sleep mode of the device during the time period. For example, as discussed supra, the UE may enter a sleep mode or may be deactivated during a time period corresponding to the allocated resources for self-calibration of the base station, and may wake up after the time period is over. For example, as discussed supra, the neighboring base station may refrain from utilizing the resources allocated for self-calibration of the base station during a time period corresponding to the allocated resources for self-calibration of the base station. In an aspect, the UE may adjust the utilization of the one or more allocated resources by: determining one or more UEs that are served by the device and are within a communication range of the base station, and refraining from assigning the one or more allocated resources to the one or more UEs. For example, as discussed supra, the neighboring base station may avoid assigning the resources allocated to the base station for self-calibration to a UE that is served by the neighboring base station and is within a communication range of the base station. In an aspect, the UE may adjust the utilization of the one or more allocated resources by: refraining from utilizing the one or more allocated resources for communication of the device. For example, as discussed supra, the neighboring base station may clear out resources by refraining from utilizing the resources allocated for the self-calibration of the base station for communication by the neighboring base station.

At 1206, the device may receive, from the base station, an additional resource indication indicating one or more additional resources allocated for the self-calibration of the base station. For example, as discussed supra, the base station needs more resources (e.g., a longer time) for self-calibration than the allocated resources for self-calibration of the base station that were indicated to neighboring base stations (e.g., via a resource allocation indication), base station may send an additional resource allocation indication to the neighboring base station. At 1208, the device may perform at least one of the deactivating the at least one component of the UE or adjusting utilization of the one or more additional resources for an additional time period corresponding to the one or more additional resources. For example, as discussed supra, when the UE served by the base station receives the additional resource allocation indication from the base station, the UE may continue to deactivate the components of the UE for an additional time period corresponding to the additional resources. For example, as discussed supra, a neighboring base station receives the additional resource allocation indication, the neighboring base stations may adjust utilization of resources corresponding to the additional resources for self-calibration of the base station for an additional time period corresponding to the additional resources.

Figure 13:
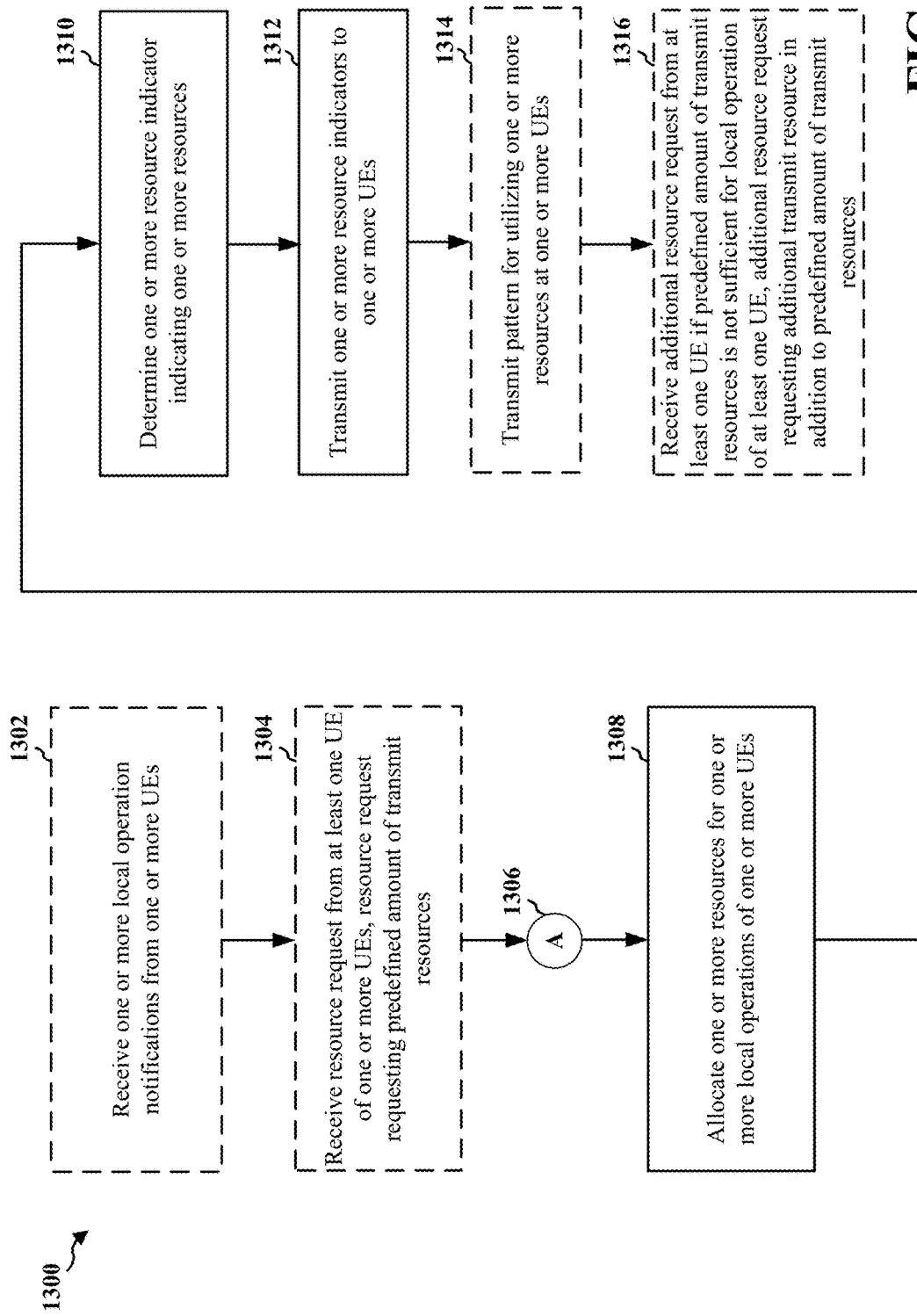
FIG. 13 is a flowchart of a method of wireless communication, according to an aspect of the disclosure.

FIG. 13 is a flowchart 1300 of a method of wireless communication. The method may be performed by a base station (e.g., the eNB 102, the base station 506, the apparatus 1802/1802'). At 1302, the base station may receive one or more local operation notifications from the one or more UEs, each of the one or more local operation notifications indicating a local operation that is local to a respective UE of the one or more UE, wherein each of the one or more local operation notifications is received from a respective UE of the one or more UEs. For example, as discussed supra, a UE (or a CPE) notifies a base station serving the UE that the UE will perform a local operation by transmitting a local operation notification to the base station. For example, as discussed supra, the local operation notification may indicate a local operation to be performed by the UE. At 1304, the base station may receive a resource request from at least one UE of the one or more UEs, the resource request indicating a request for a predefined amount of transmit resources. For example, as discussed supra, the resource request may indicate a request for a certain amount of resources, based on the amount of time needed for the UE to perform the local operation. In an aspect, the resource request may be included in a local operation notification of the one or more local operation notifications. For example, as discussed supra, the resource request may be included in the local operation notification transmitted to the base station. In an aspect, the resource request may include a number of antenna elements of the at least one UE. For example, as discussed supra, the resource request may also include a number of antenna elements of the UE. At 1306, the base station may perform additional features as discussed infra.

At 1308, the base station allocates one or more resources for one or more local operations of one or more UEs. In an aspect, the one or more local operations may include at least one of self-calibration or transmission blockage detection. For example, as discussed supra, resources may be allocated by the base station for local operation of one or more UEs, such that interference experienced in the allocated resources during the local operation may be reduced. In an aspect, the one or more resources may be allocated in response to the one or more local operation notifications. For example, as discussed supra, in response to the local operation notification, the base station may allocate resources for the local operation. In an aspect, the allocation of the one or more resources may be based on the resource request. For example, as discussed supra, the base station may receive the resource request, and estimate a number of resources to allocate based on the amount of resources (e.g., time) indicated in the resource request.

At 1310, the base station determines one or more resource indicators indicating the one or more resources. At 1312, the base station transmits the one or more resource indicators to the one or more UEs. For example, as discussed supra, the base station transmits a resource indicator indicating the allocated resources. In an aspect, each of the one or more resource indicators is transmitted via DCI. For example, as discussed supra, the base station may send the resource indicator via a control channel such as a PDCCH and/or via DCI. In an aspect, the one or more resource indicators may include a first indicator for a first resource and a second indicator for a second resource, and if a first UE of the one or more UEs is within a signal interference zone of a second UE of the one or more UEs, the first indicator and the second indicator are transmitted to the first UE and the second UE, respectively. For example, as illustrated in FIG. 8, an interference zone 852 of the first UE 822 overlaps with an interference zone 854 of the second UE 824, and thus the base station 802 may not allocate the same resources for the local operation to the first UE 822 and the second UE 824, and may allocate different resources.

In an aspect, the one or more resource indicators indicates one or more subcarriers available for the one or more local operations. For example, as discussed supra, the base station may allocate several component carriers (CCs) as resources for UE's local operation. In such an aspect, the one or more resource indicators further indicate one or more second subcarriers available for transmission of a signal unrelated to the local operation. For example, as discussed supra, if the UE uses a portion of the several CCs for the UE's local operation, the base station may use the remaining portion of the several CCs not used for local operation for other operations, where the remaining portion is not used for UE's local operation. In such an aspect, the one or more subcarriers may be within subframes for RACH signaling. For example, as discussed supra, if each CC is 100 MHz, in each CC allocated for the local operation, a UE may utilize 15 MHz for the local operation and thus the base station may allocate the remaining 85 MHz to RACH signaling. In such an aspect, information about the one or more second subcarriers may be transmitted via a SIB. For example, as discussed supra, the base station may advertise to other UEs information about available CCs for RACH signaling in a SIB when the base station operates in a CA mode.

At 1314, the base station may transmit a pattern for utilizing the one or more resources at the one or more UEs. For example, as discussed supra, the UE may utilize one or more of the allocated resources to transmit a reference signal based on a predefined pattern. For example, as discussed supra, the base station may provide the predefined pattern to the UE.

At 1316, the base station may receive an additional resource request from the at least one UE if the predefined amount of transmit resources is not sufficient for a local operation of the at least one UE, the additional resource request requesting an additional transmit resource in addition to the predefined amount of transmit resources. For example, as discussed supra, if the UE needs more resources (e.g., a longer time for calibration), beyond the amount of resources the UE requested initially via the resource request, UE may send an additional resource request to the base station. For example, as discussed supra, the additional resource request may indicate an additional amount of resources (e.g., additional time) needed for the UE to complete the local operation.

Figure 14:
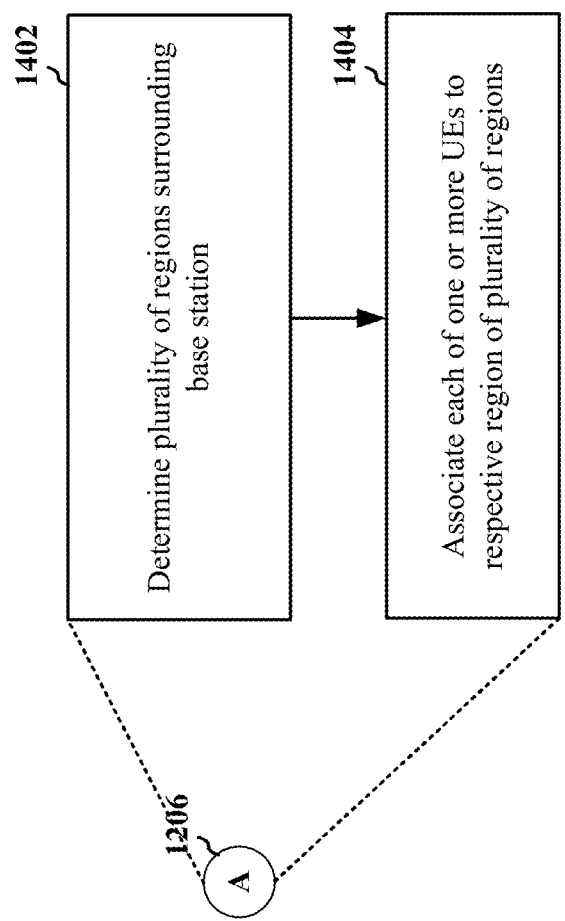
FIG. 14 is a flowchart of a method of wireless communication, expanding from the flowchart of FIG. 13.

FIG. 14 is a flowchart 1400 of a method of wireless communication, expanding from the flowchart 1300 of FIG. 13. The method may be performed by a base station (e.g., the eNB 102, the base station 506, the apparatus 1802/1802'). The flowchart 1400 includes the features performed at 1306. At 1402, the base station may determine a plurality of regions surrounding the base station. At 1404, the base station may associate each of the one or more UEs with a respective region of the plurality of regions. In an aspect, the association may be based on a location of each of the one or more UEs. In an aspect, the one or more resource indicators may be determined based on the association. For example, as discussed supra, if a base station can determine location information of different UEs that are transmitting local operation notifications, the base station may use the location information of the UEs to form groups of UEs based on regions occupied by respective UEs. For example, as discussed supra, the base station may define various regions around the base station, and may determine which region is occupied by each UE.

In an aspect, the one or more resource indicators may include a first indicator for a first resource and a second indicator for a second resource, and if a first UE of the one or more UEs is associated with a same region of the plurality of regions as a second UE of the one or more UEs, the first indicator and the second indicator may be transmitted to the first UE and the second UE, respectively. For example, as discussed supra, if a first and second UEs are in the same region, the base station may allocate a first set of resources for the first UE to perform the local operation and may allocate a second set of resources for the second UE to perform the local operation, where the first set of resources are different from the second set of resources. For example, as discussed supra, the base station may send a first indicator indicating the first set of resources to the first UE and may send a second indicator indicating the second set of resources to the second UE. In an aspect, if a first UE and a second UE of the one or more UEs are associated with different regions of the plurality of regions, a first indicator of the one or more resource indicators is transmitted to the first UE and a second indicator of the one or more resource indicators is transmitted the second UE, each of the first indicator and the second indicator indicating a same resource. For example, as discussed supra, if the base station determines that a first UE is in a first region, and a second UE is in a second region distant from the first region (e.g., at least two regions away from the first region), the first and second UEs may utilize the same resources to perform the local operation because the first and second UEs may be sufficiently distant from each other and thus may not interfere with each other. For example, as discussed supra, the base station may send a resource indicator indicating the same resources allocated for the local operation to the first UE and the second UE.

Figure 15:
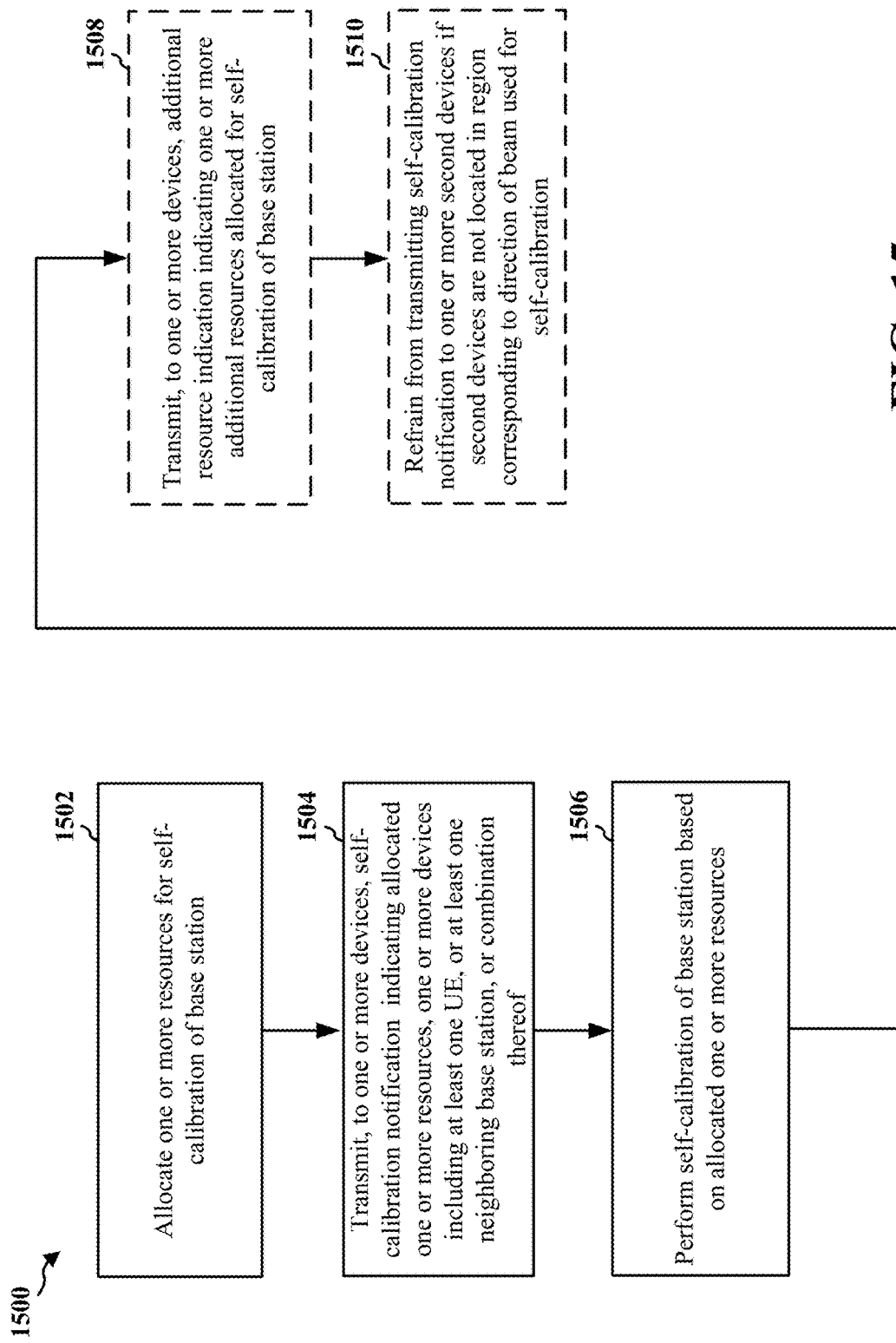
FIG. 15 is a flowchart of a method of wireless communication, according to an aspect of the disclosure.

FIG. 15 is a flowchart 1500 of a method of wireless communication. The method may be performed by a base station (e.g., the eNB 102, the base station 906, the apparatus 1802/1802'). At 1502, the base station may allocate one or more resources for self-calibration of the base station. For example, as discussed supra, a base station may initiate self-calibration of the base station by allocating resources for self-calibration of the base station. At 1504, the base station transmits, to one or more devices, a self-calibration notification indicating the allocated one or more resources, the one or more devices including at least one UE, or at least one neighboring base station, or a combination thereof. For example, as discussed supra, the base station may notify a UE that the base station will perform self-calibration by transmitting a self-calibration notification to the neighboring base stations. For example, as discussed supra, the base station may notify neighboring base stations that the base station will perform self-calibration by transmitting a self-calibration notification to the neighboring base stations. For example, as discussed supra, the self-calibration notification may indicate a self-calibration to be performed by the base station and may include an indication to indicate the allocated resources for self-calibration of the base station. At 1506, the base station performs the self-calibration of the base station based on the allocated one or more resources. For example, as discussed supra, the base station performs self-calibration using the allocated resources.

In an aspect, the base station may perform the self-calibration by: transmitting a reference signal using the allocated one or more resources, measuring one or more parameters from the transmitted reference signal, and calibrating the base station based on the measured one or more parameters and based on one or more standard parameters associated with the reference signal. For example, as discussed supra, the base station may perform self-calibration based on the measured parameters of the reference signal and standard parameters of the reference signal, where the standard parameters may be ideal parameters without error or interference. In an aspect, the reference signal includes at least one of a demodulation reference signal, a sounding reference signal or a calibration reference signal used for calibration. For example, as discussed supra, the reference signal may include at least one of a demodulation reference signal, a sounding reference signal, or a newly-defined calibration reference signal that may be used for calibration.

In an aspect, the calibrating the base station is based on a comparison between the measured one or more parameters and the one or more standard parameters. For example, as discussed supra, during the self-calibration, the base station may compare the measured parameters with the standard parameters, and calibrate the base station according to the comparison (e.g., by calibrating the base station to have the measured parameters match closely with the standard parameters, within certain error tolerances). In an aspect, the one or more parameters include at least one of an amplitude or a phase. For example, as discussed supra, the parameters may include an amplitude and/or a phase. For example, as discussed supra, the base station may measure an amplitude and a phase received by the RX chain of the transmitted reference signal, and compare the measured amplitude and the measured phase with a standard amplitude and a standard phase, respectively, to calibrate the base station.

In an aspect, the one or more resources include a plurality of transmit resources, and one or more of the plurality of transmit resources are each used for transmission of the reference signal based on a predefined pattern. For example, as discussed supra, the base station may utilize one or more of the allocated resources to transmit a reference signal based on a predefined pattern.

In an aspect, at 1508, the base station may transmit, to the one or more devices, an additional resource indication indicating one or more additional resources allocated for the self-calibration of the base station. For example, as discussed supra, the base station may need more resources (e.g., a longer time) for self-calibration than the allocated resources for self-calibration of the base station that were indicated to neighboring base stations (e.g., via a resource allocation indication), base station may send an additional resource allocation indication to the neighboring base station.

In an aspect, at 1510, the base station refrains from transmitting the self-calibration notification to one or more second devices if the second devices are not located in a region corresponding to the direction of a beam used for the self-calibration. In such an aspect, the self-calibration notification is transmitted to the one or more devices if the one or more devices are located in a region corresponding to a direction of a beam used for the self-calibration. For example, as discussed supra, if a device is located in a region corresponding to a direction of base station's beam that is used for self-calibration, the base station may determine to transmit the self-calibration notification to the device. For example, as discussed supra, if a device is not located in the region corresponding to the direction of the base station's beam that is used for self-calibration, then the base station may refrain from transmitting the self-calibration notification to the device.

Figure 16:
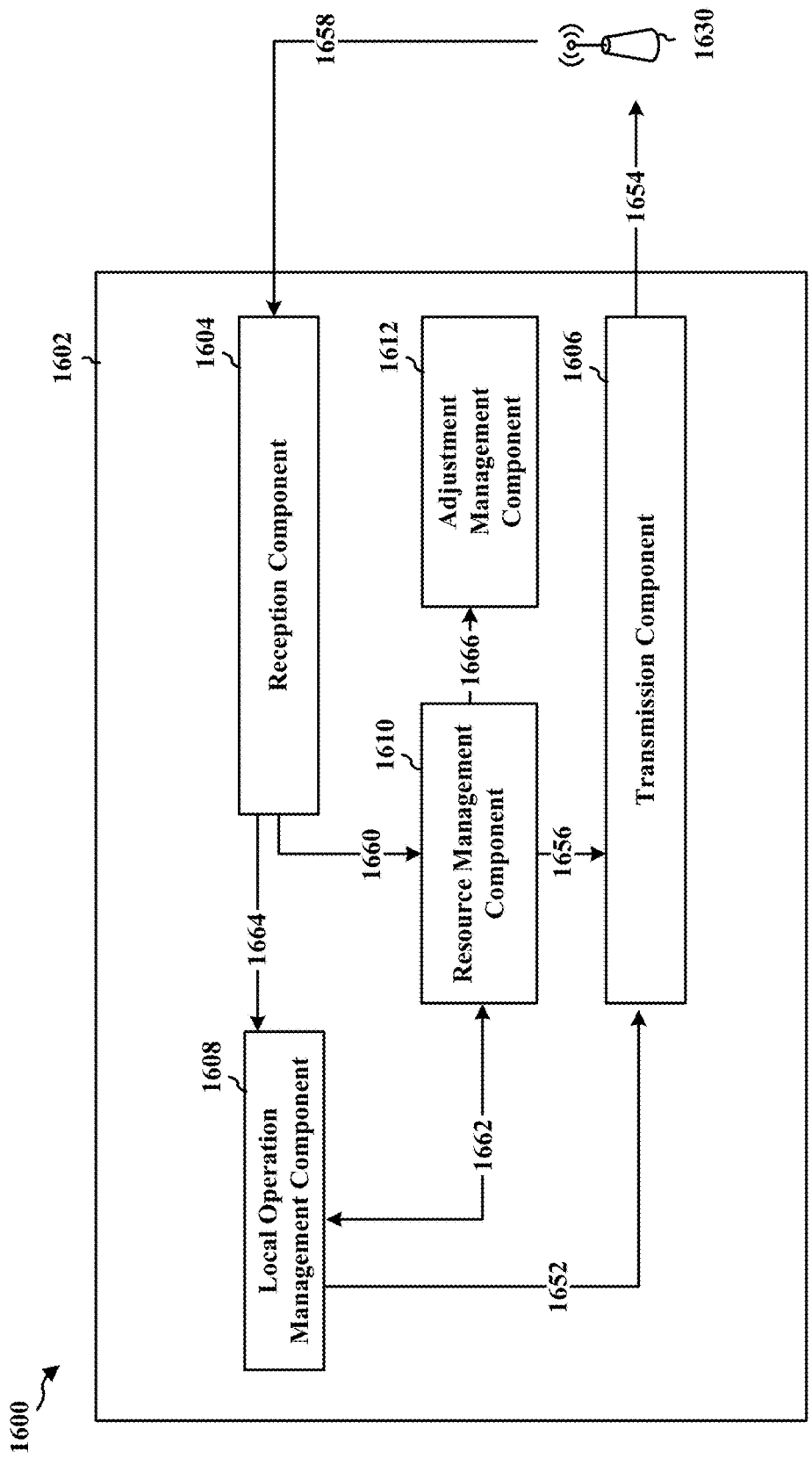
FIG. 16 is a conceptual data flow diagram illustrating the data flow between different means/components in an exemplary apparatus.

FIG. 16 is a conceptual data flow diagram 1600 illustrating the data flow between different means/components in an exemplary apparatus 1602. The apparatus includes a reception component 1604, a transmission component 1606, a local operation management component 1608, a resource management component 1610, and an adjustment management component 1612.

According to one aspect, the apparatus may be a UE, where the UE may perform a local operation of the UE. The local operation management component 1608 transmits, via the transmission component 1606, a local operation notification to a base station 1630, at 1652 and 1654, the local operation notification indicating a local operation that is local to the UE. In an aspect, the local operation notification may be transmitted via at least one of a MAC control element or physical layer signaling. The resource management component 1610 may transmit, via the transmission component 1606, a resource request to request a predefined amount of transmit resources, at 1656 and 1654. In an aspect, the resource request may be included in the local operation notification. In an aspect, the resource request may include a number of antenna elements of the UE.

The resource management component 1610 may receive, from the base station 1630 via the reception component 1604, a resource indicator indicating one or more resources for a local operation, at 1658 and 1660. In an aspect, the resource indicator may be received via DCI. In an aspect, the one or more resources may include a plurality of transmit resources, and the plurality of transmit resources may be used to form one or more beam patterns for performing the local operation. In an aspect, the resource indicator may be based on the resource request. The resource management component 1610 may forward information about the resource indicator to the local operation management component 1608, at 1662.

The local operation management component 1608 performs the local operation using the one or more resources (e.g., via the transmission component 1606 and the reception component 1604 at 1652 and 1664). In an aspect, the local operation management component 1608 performs the local operation by: transmitting a reference signal using the one or more resources (e.g., via the transmission component 1606 at 1652), determining one or more parameters based on the transmitted reference signal (e.g., via the reception component 1604 and the local operation management component 1608 at 1664), performing the local operation based on the determined one or more parameters (e.g., via the local operation management component 1608).

In an aspect, the local operation may be self-calibration of the UE. In such an aspect, the local operation management component 1608 may determine the one or more parameters by measuring the one or more parameters from the transmitted reference signal, where the local operation may be performed based on the one or more parameters and based on one or more standard parameters. In such an aspect, the one or more parameters may include at least one of an amplitude or a phase. In an aspect, the reference signal includes at least one of a demodulation reference signal, a sounding reference signal or a calibration reference signal used for calibration. In an aspect, the calibrating the UE is based on a comparison between the measured one or more parameters and the one or more standard parameters.

In an aspect, the local operation may be transmission blockage detection. In such an aspect, the local operation management component 1608 may determine the one or more parameters by: receiving a reflected signal of the transmitted reference signal (e.g., via the reception component 1604 and the local operation management component 1608 at 1664), and determining a signal strength of the reflected signal and a round-trip time of the reference signal based on a time of the transmission of the reference signal and a time of the reception of the reflected signal, where the one or more parameters include the signal strength of the reflected signal and the round-trip time of the reference signal. In such an aspect, the local operation (e.g., the transmission blockage detection) may be performed based on the signal strength of the reflected signal and the round-trip time of the reference signal. In such an aspect, the local operation management component 1608 may perform the local operation by: determining whether a transmission path is blocked by an object based on the signal strength of the reflected signal and the round-trip time of the reference signal, and determining a type of object blocking the transmission path based on the signal strength of the reflected signal and the round-trip time of the reference signal if the transmission path is blocked.

In a case where the local operation is transmission blockage detection, the local operation management component 1608 determines whether the transmission path is blocked. If the transmission path is blocked, the local operation management component 1608 determines whether the type of the object blocking the transmission path is a human tissue type. The local operation management component 1608 may forward results from the transmission blockage detection to the transmission component 1606, at 1652. If the transmission path is not blocked or the type of the object blocking the transmission path is not the human tissue type, the transmission component 1606 utilizes the transmission path for signal transmission. If the type of the object blocking the transmission path is the human tissue type, the transmission component 1606 refrains from transmitting a signal on the transmission path.

In an aspect, the transmission component 1606 may select a second transmission path that is not blocked by the object. At 1112, the transmission component 1606 may utilize the second transmission path for signal transmission.

In an aspect, the transmission component 1606 may transmit, to the base station 1630, a blockage notification indicating the blockage via the transmission path if the type of the object blocking the transmission path is a human tissue type, at 1654.

In an aspect, the one or more resources include a plurality of transmit resources, and one or more of the plurality of transmit resources are each used for transmission of the reference signal based on a predefined pattern. In such an aspect, the predefined pattern is received from the base station.

The resource management component 1610 may transmit, via the transmission component 1606, an additional resource request requesting an additional transmit resource in addition to the predefined amount of transmit resources if the predefined amount of transmit resources is not sufficient for the local operation, at 1656 and 1654. The local operation management component 1608 may communicate to the resource management component 1610 the need for an additional transmit resource, at 1662.

According to another aspect, the apparatus may be a UE or a neighboring base station, where the apparatus may manage the apparatus based on self-calibration of a base station. The resource management component 1610 receives, from the base station 1630 via the reception component 1604, a self-calibration notification indicating one or more resources allocated for a self-calibration of the base station 1630, at 1658 and 1660. The resource management component 1610 may forward the information about the one or more allocated resources to the adjustment management component 1612, at 1666. The resource management component 1610 performs, in response to the self-calibration notification, at least one of deactivating (e.g., via the adjustment management component 1612) at least one component of the apparatus based on the one or more allocated resources or adjusting utilization of the one or more allocated resources allocated for the self-calibration of the base station. In an aspect, the apparatus performs the at least one of the deactivating the at least one component of the apparatus or adjusting the utilization of the one or more allocated resources by performing the at least one of the deactivating the at least one component of the apparatus or the refraining from utilizing the one or more resources during a time period corresponding to the one or more allocated resources. In such an aspect, the apparatus may deactivate the at least one component of the apparatus by entering a sleep mode of the apparatus during the time period. In an aspect, the adjustment management component 1612 may adjust the utilization of the one or more allocated resources by: determining one or more UEs that are served by the apparatus and are within a communication range of the base station 1630, and refraining from assigning the one or more allocated resources to the one or more UEs. In an aspect, the adjustment management component 1612 may adjust the utilization of the one or more allocated resources by: refraining from utilizing the one or more allocated resources for communication of the apparatus.

The resource management component 1610 receives, from the base station 1630 via the reception component 1604, an additional resource indication indicating one or more additional resources allocated for the self-calibration of the base station 1630, at 1658 and 1660. The resource management component 1610 may forward the information about the one or more additional resources to the adjustment management component 1612, at 1666. The resource management component 1610 may perform (e.g., via the adjustment management component 1612) at least one of the deactivating the at least one component of the UE or adjusting utilization of the one or more additional resources for an additional time period corresponding to the one or more additional resources The apparatus may include additional components that perform each of the blocks of the algorithm in the aforementioned flowcharts of FIGS. 10-12. As such, each block in the aforementioned flowcharts of FIGS. 10-12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 17:
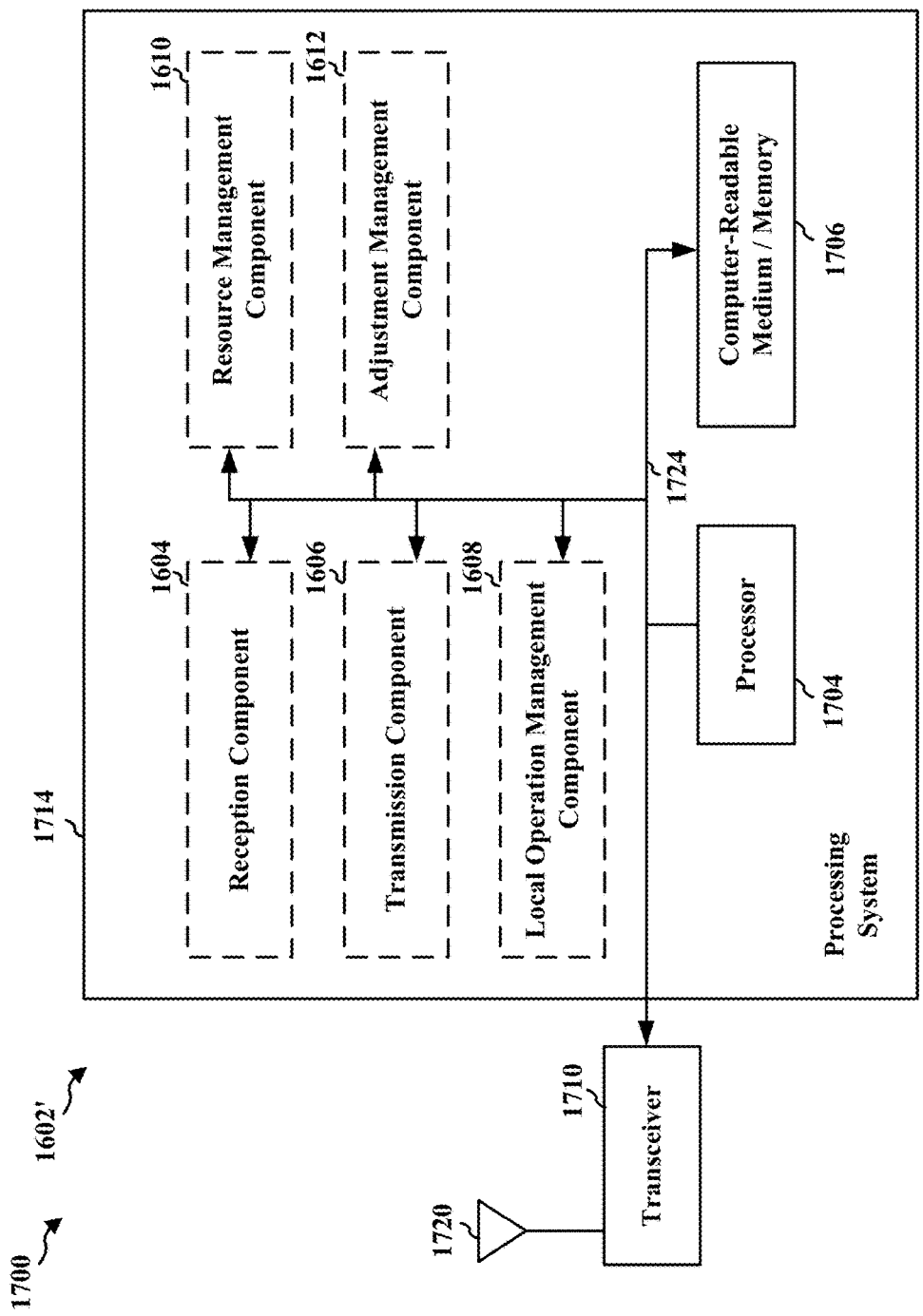
FIG. 17 is a diagram illustrating an example of a hardware implementation for an apparatus employing a processing system.

FIG. 17 is a diagram 1700 illustrating an example of a hardware implementation for an apparatus 1602' employing a processing system 1714. The processing system 1714 may be implemented with a bus architecture, represented generally by the bus 1724. The bus 1724 may include any number of interconnecting buses and bridges depending on the specific application of the processing system 1714 and the overall design constraints. The bus 1724 links together various circuits including one or more processors and/or hardware components, represented by the processor 1704, the components 1604, 1606, 1608, 1610, 1612, and the computer-readable medium/memory 1706. The bus 1724 may also link various other circuits such as timing sources, peripherals, voltage regulators, and power management circuits, which are well known in the art, and therefore, will not be described any further.

The processing system 1714 may be coupled to a transceiver 1710. The transceiver 1710 is coupled to one or more antennas 1720. The transceiver 1710 provides a means for communicating with various other apparatus over a transmission medium. The transceiver 1710 receives a signal from the one or more antennas 1720, extracts information from the received signal, and provides the extracted information to the processing system 1714, specifically the reception component 1604. In addition, the transceiver 1710 receives information from the processing system 1714, specifically the transmission component 1606, and based on the received information, generates a signal to be applied to the one or more antennas 1720. The processing system 1714 includes a processor 1704 coupled to a computer-readable medium/memory 1706. The processor 1704 is responsible for general processing, including the execution of software stored on the computer-readable medium/memory 1706. The software, when executed by the processor 1704, causes the processing system 1714 to perform the various functions described supra for any particular apparatus. The computer-readable medium/memory 1706 may also be used for storing data that is manipulated by the processor 1704 when executing software. The processing system 1714 further includes at least one of the components 1604, 1606, 1608, 1610, 1612. The components may be software components running in the processor 1704, resident/stored in the computer readable medium/memory 1706, one or more hardware components coupled to the processor 1704, or some combination thereof. The processing system 1714 may be a component of the UE 350 and may include the memory 360 and/or at least one of the TX processor 368, the RX processor 356, and the controller/processor 359.

In one configuration, the apparatus 1602/1602' for wireless communication includes means for transmitting a local operation notification to a base station, the local operation notification indicating a local operation that is local to the apparatus 1602/1602', means for receiving, from the base station, a resource indicator indicating one or more resources for a local operation, and means for performing the local operation using the one or more resources. In an aspect, the means for performing the local operation is configured to: transmit a reference signal using the one or more resources, determine one or more parameters based on the transmitted reference signal, perform the local operation based on the determined one or more parameters.

In an aspect where the local operation is self-calibration of the apparatus 1602/1602', the means for determining the one or more parameters is configured to: measure the one or more parameters from the transmitted reference signal, where the local operation is performed based on the one or more parameters and based on one or more standard parameters.

In an aspect where the local operation is transmission blockage detection, the means for determining the one or more parameters is configured to: receive a reflected signal of the transmitted reference signal, and determine a signal strength of the reflected signal and a round-trip time of the reference signal based on a time of the transmission of the reference signal and a time of the reception of the reflected signal, where the one or more parameters include the signal strength of the reflected signal and the round-trip time of the reference signal and the local operation is performed based on the signal strength of the reflected signal and the round-trip time of the reference signal. In such an aspect, the means for performing the local operation is configured to: whether a transmission path is blocked by an object based on the signal strength of the reflected signal and the round-trip time of the reference signal, or determine a type of the object blocking the transmission path based on the signal strength of the reflected signal and the round-trip time of the reference signal if the transmission path is blocked. In such an aspect, apparatus 1602/1602' may further include means for refraining from transmitting a signal on via the transmission path if the type of the object blocking the transmission path is a human tissue type, and means for utilizing the transmission path for signal transmission if the transmission path is not blocked or if the type of the object blocking the transmission path is not the human tissue type. In such an aspect, apparatus 1602/1602' may further include means for selecting a second transmission path that is not blocked by the object, and means for utilizing the second transmission path for signal transmission. In such an aspect, apparatus 1602/1602' may further include means for transmitting, to the base station, a blockage notification indicating the blockage on via the transmission path if the type of the object blocking the transmission path is a human tissue type.

In an aspect, the apparatus 1602/1602' further comprises means for transmitting a resource request to request a predefined amount of transmit resources, where the resource indicator is based on the resource request. In an aspect, the apparatus 1602/1602' further comprises means for transmitting an additional resource request requesting an additional transmit resource in addition to the predefined amount of transmit resources if the predefined amount of transmit resources is not sufficient for the local operation.

In one configuration, the apparatus 1602/1602' for wireless communication includes means for receiving, from a base station, a self-calibration notification indicating one or more resources allocated for a self-calibration of the base station, means for performing, in response to the self-calibration notification, at least one of deactivating at least one component of the apparatus 1602/1602' based on the one or more allocated resources or adjusting utilization of the one or more allocated resources allocated for the self-calibration of the base station. In an aspect, the means for deactivating the at least one component of the apparatus 1602/1602' is configured to: enter a sleep mode of the apparatus 1602/1602' during the time period. In an aspect, the means for performing the adjusting utilization of the one or more allocated resources allocated for the self-calibration of the base station may be configured to: determine one or more UEs that are served by the apparatus 1602/1602' and are within a communication range of the base station, and refrain from assigning the one or more allocated resources to the one or more UEs. In an aspect, the means for performing the adjusting utilization of the one or more allocated resources allocated for the self-calibration of the base station may be configured to: refrain from utilizing the one or more allocated resources for communication of the device. In an aspect, the apparatus 1602/1602' further includes means for receiving, from the base station, an additional resource indication indicating one or more additional resources allocated for the self-calibration of the base station, and means for performing at least one of the deactivating the at least one component of the UE or adjusting utilization of the one or more additional resources for an additional time period corresponding to the one or more additional resources.

The aforementioned means may be one or more of the aforementioned components of the apparatus 1602 and/or the processing system 1714 of the apparatus 1602' configured to perform the functions recited by the aforementioned means. As described supra, the processing system 1714 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 18:
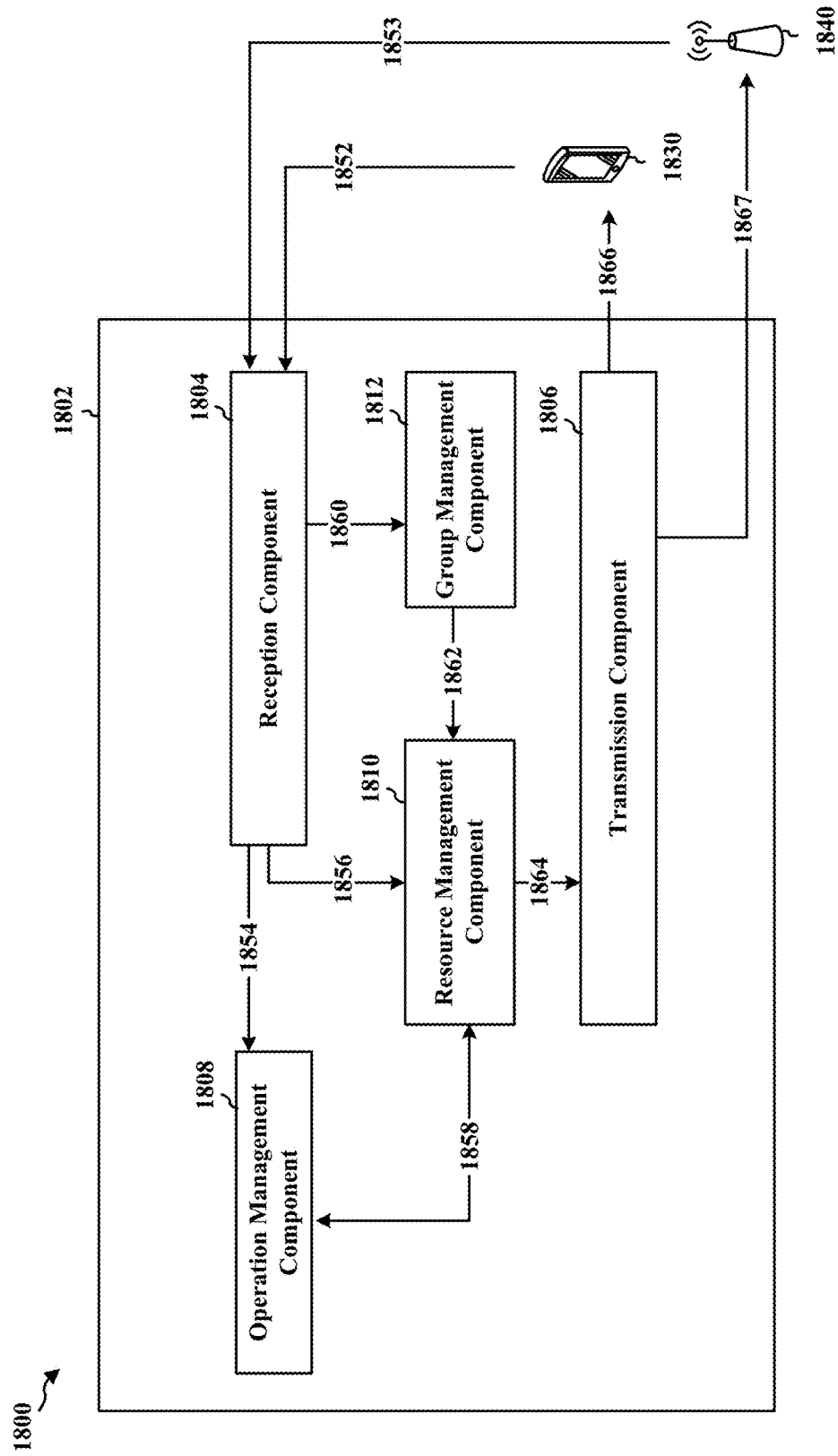
FIG. 18 is a conceptual data flow diagram illustrating the data flow between different means/components in an exemplary apparatus.

FIG. 18 is a conceptual data flow diagram 1800 illustrating the data flow between different means/components in an exemplary apparatus 1802. The apparatus may be a base station. The apparatus includes a reception component 1804, a transmission component 1806, an operation management component 1808, a resource management component 1810, and a group management component 1812.

According to one aspect of the disclosure, the base station may allocate resources for a UE to perform one or more local operations of the UE. The operation management component 1808 may receive, via the reception component 1804, one or more local operation notifications from the one or more UEs (e.g., UE 1830), each of the one or more local operation notifications indicating a local operation that is local to a respective UE of the one or more UE, where each of the one or more local operation notifications is received from a respective UE of the one or more UEs, at 1852 and 1854. The resource management component 1810 receive, via the reception component 1804, a resource request from at least one UE of the one or more UEs, the resource request indicating a request for a predefined amount of transmit resources, at 1852 and 1856. In an aspect, the resource request may be included in a local operation notification of the one or more local operation notifications. In an aspect, the resource request may include a number of antenna elements of the at least one UE. In an aspect, the operation management component 1808 may forward the one or more local operation notifications to the resource management component 1810, at 1858.

The resource management component 1810 allocates one or more resources for one or more local operations of one or more UEs. In an aspect, the one or more resources may be allocated in response to the one or more local operation notifications. In an aspect, the allocation of the one or more resources may be based on the resource request. In an aspect, the one or more local operations may include at least one of self-calibration or transmission blockage detection.

The resource management component 1810 determines one or more resource indicators indicating the one or more resources.

In an aspect, the group management component 1812 may determine a plurality of regions surrounding the base station. The group management component 1812 may associate each of the one or more UEs with a respective region of the plurality of regions (e.g., based on information received via the reception component 1804 at 1860). The group management component 1812 may forward, to the resource management component 1810, information about the association of each of the one or more UEs with a respective region of the plurality of regions, at 1862. In an aspect, the one or more resource indicators may be determined by the resource management component 1810 based on the association.

In an aspect, the one or more resource indicators may include a first indicator for a first resource and a second indicator for a second resource, and if a first UE of the one or more UEs is associated with a same region of the plurality of regions as a second UE of the one or more UEs, the first indicator and the second indicator may be transmitted to the first UE and the second UE, respectively. In an aspect, if a first UE and a second UE of the one or more UEs are associated with different regions of the plurality of regions, a first indicator of the one or more resource indicators is transmitted to the first UE and a second indicator of the one or more resource indicators is transmitted the second UE, each of the first indicator and the second indicator indicating a same resource. In an aspect, the association may be based on a location of each of the one or more UEs.

The resource management component 1810 transmits, via the transmission component 1806, the one or more resource indicators to the one or more UEs (e.g., the UE 1830), at 1864 and 1866. In an aspect, the one or more resource indicators may include a first indicator for a first resource and a second indicator for a second resource, and if a first UE of the one or more UEs is within a signal interference zone of a second UE of the one or more UEs, the first indicator and the second indicator are transmitted to the first UE and the second UE, respectively. In an aspect, each of the one or more resource indicators is transmitted via DCI. In an aspect, the one or more resource indicators indicate one or more subcarriers available for the one or more local operations. In such an aspect, the one or more resource indicators further indicate one or more second subcarriers available for transmission of a signal unrelated to the one or more local operations. In such an aspect, the one or more subcarriers may be within subframes for RACH signaling. In such an aspect, information about the one or more second subcarriers are may be transmitted via a SIB.

The resource management component 1810 may transmit, via the transmission component 1806, a pattern for utilizing the one or more resources at the one or more UEs, at 1864 and 1866. The resource management component 1810 may receive, via a reception component 1804, an additional resource request from the at least one UE (e.g., the UE 1830), at 1852 and 1856, if the predefined amount of resources is not sufficient for a local operation of the at least one UE, the additional resource request indicating a request for an additional transmit resource in addition to the predefined amount of transmit resources.

In another aspect of the disclosure, the base station may determine to perform self-calibration of the base station, and thus may send the UE information about resources for the self-calibration of the base station. The operation management component 1808 determines to perform self-calibration of the base station, and may inform the resource management component 1810 about the determination, at 1858. The resource management component 1810 allocates one or more resources for the self-calibration of the base station. The resource management component 1810 transmits via the transmission component 1806 a self-calibration notification indicating the allocated one or more resources, to one or more devices such as UEs (e.g., UE 1830) at 1864 and 1866 and/or to one or more neighboring base stations (e.g., neighboring base station 1840) at 1864 and 1867. In an aspect, the neighboring base station 1840 may transmit information to the base station via the reception component 1804 at 1853.

The resource management component 1810 may forward information about the allocated one or more resources to the operation management component 1808, at 1858. The operation management component 1808 performs the self-calibration of the base station based on the allocated one or more resources.

In an aspect, the base station may perform the self-calibration by: transmitting a reference signal using the allocated one or more resources, measuring one or more parameters from the transmitted reference signal, and calibrating the base station based on the measured one or more parameters and based on one or more standard parameters. In an aspect, the reference signal includes at least one of a demodulation reference signal, a sounding reference signal or a calibration reference signal used for calibration. In an aspect, the calibrating the base station is based on a comparison between the measured one or more parameters and the one or more standard parameters. In an aspect, the one or more parameters include at least one of an amplitude or a phase. In an aspect, the one or more resources include a plurality of transmit resources, and one or more of the plurality of transmit resources are each used for transmission of the reference signal based on a predefined pattern.

In an aspect, the resource management component 1810 may transmit via the transmission component 1806 an additional resource indication indicating one or more additional resources allocated for the self-calibration of the base station, to one or more UEs (e.g., UE 1830) at 1864 and 1866 and/or to one or more neighboring base stations (e.g., neighboring base station 1840) at 1864 and 1867.

In an aspect, the operation management component 1808 may refrains from transmitting the self-calibration notification to one or more second devices (e.g., second UE and/or second base station) if the second devices are not located in the region corresponding to the direction of the beam used for the self-calibration. In such an aspect, the self-calibration notification is transmitted to the one or more devices (e.g., UE 1830 and/or neighboring base station 1840) if the one or more devices are located in a region corresponding to a direction of a beam used for the self-calibration.

The apparatus may include additional components that perform each of the blocks of the algorithm in the aforementioned flowcharts of FIGS. 13-15. As such, each block in the aforementioned flowcharts of FIGS. 13-15 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 19:
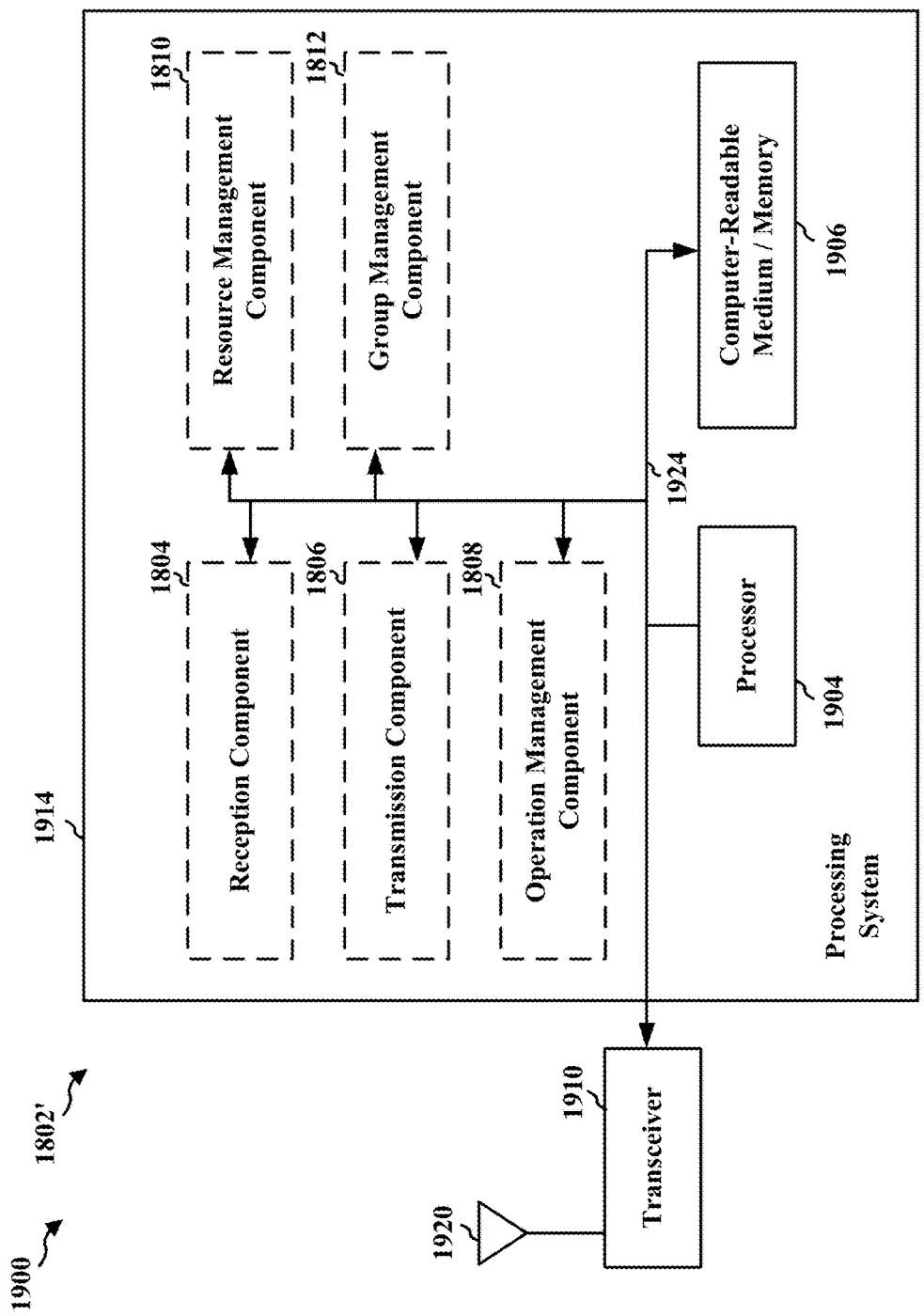
FIG. 19 is a diagram illustrating an example of a hardware implementation for an apparatus employing a processing system.

FIG. 19 is a diagram 1900 illustrating an example of a hardware implementation for an apparatus 1802' employing a processing system 1914. The processing system 1914 may be implemented with a bus architecture, represented generally by the bus 1924. The bus 1924 may include any number of interconnecting buses and bridges depending on the specific application of the processing system 1914 and the overall design constraints. The bus 1924 links together various circuits including one or more processors and/or hardware components, represented by the processor 1904, the components 1804, 1806, 1808, 1810, 1812, and the computer-readable medium/memory 1906. The bus 1924 may also link various other circuits such as timing sources, peripherals, voltage regulators, and power management circuits, which are well known in the art, and therefore, will not be described any further.

The processing system 1914 may be coupled to a transceiver 1910. The transceiver 1910 is coupled to one or more antennas 1920. The transceiver 1910 provides a means for communicating with various other apparatus over a transmission medium. The transceiver 1910 receives a signal from the one or more antennas 1920, extracts information from the received signal, and provides the extracted information to the processing system 1914, specifically the reception component 1804. In addition, the transceiver 1910 receives information from the processing system 1914, specifically the transmission component 1806, and based on the received information, generates a signal to be applied to the one or more antennas 1920. The processing system 1914 includes a processor 1904 coupled to a computer-readable medium/memory 1906. The processor 1904 is responsible for general processing, including the execution of software stored on the computer-readable medium/memory 1906. The software, when executed by the processor 1904, causes the processing system 1914 to perform the various functions described supra for any particular apparatus. The computer-readable medium/memory 1906 may also be used for storing data that is manipulated by the processor 1904 when executing software. The processing system 1914 further includes at least one of the components 1804, 1806, 1808, 1810, 1812. The components may be software components running in the processor 1904, resident/stored in the computer readable medium/memory 1906, one or more hardware components coupled to the processor 1904, or some combination thereof. The processing system 1914 may be a component of the eNB 310 and may include the memory 376 and/or at least one of the TX processor 316, the RX processor 370, and the controller/processor 375.

In one configuration, the apparatus 1802/1802' for wireless communication includes means for allocating one or more resources for one or more local operations of one or more UEs, means for determining one or more resource indicators indicating the one or more resources, and means for transmitting the one or more resource indicators to the one or more UEs. In an aspect, the apparatus 1802/1802' further includes means for receiving one or more local operation notifications from the one or more UEs, each of the one or more local operation notifications indicating a local operation that is local to a respective UE of the one or more UE, where each of the one or more self-calibration notifications is received from a respective UE of the one or more UEs, wherein the one or more resources are allocated in response to the one or more self-calibration notifications. In an aspect, the apparatus 1802/1802' further includes means for determining a plurality of regions surrounding the apparatus 1802/1802', and means for associating each of the one or more UEs to a respective region of the plurality of regions, where the one or more resource indicators are determined based on the association. In an aspect, the apparatus 1802/1802' further includes means for receiving a resource request from at least one UE of the one or more UEs, the resource request requesting a predefined amount of transmit resources, where the one or more resources are allocated in response to the one or more self-calibration notifications. In such an aspect, the apparatus 1802/1802' further includes means for receiving an additional resource request from the at least one UE if the predefined amount of transmit resources is not sufficient for a local operation of the at least one UE, the additional resource request requesting an additional transmit resource in addition to the predefined amount of transmit resources. In an aspect, the apparatus 1802/1802' further includes means for transmitting a pattern for utilizing the one or more resources at the one or more UEs.

In one configuration, the apparatus 1802/1802' for wireless communication includes means for allocating one or more resources for self-calibration of the apparatus 1802/1802', means for transmitting, to one or more devices, a self-calibration notification indicating the allocated one or more resources, and means for performing the self-calibration of the apparatus 1802/1802' based on the allocated one or more resources. In an aspect, the apparatus 1802/1802' may further include means for transmitting, to the one or more devices, an additional resource indication indicating one or more additional resources allocated for the self-calibration of the base station. In an aspect, the apparatus 1802/1802' may further include means for refraining from transmitting the self-calibration notification to one or more second devices if the second devices are not located in a region corresponding to the direction of a beam used for the self-calibration.

The aforementioned means may be one or more of the aforementioned components of the apparatus 1802 and/or the processing system 1914 of the apparatus 1802' configured to perform the functions recited by the aforementioned means. As described supra, the processing system 1914 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication by a device, comprising:
   receiving, from a base station, a self-calibration notification indicating a self-calibration to be performed by the base station and one or more resources allocated for [the self-calibration of the base station; and
   performing, by the device, in response to the self-calibration notification, at least one of deactivating at least one component of the device based on the one or more allocated resources or adjusting utilization of the one or more allocated resources allocated for the self-calibration of the base station,
   wherein the deactivating one component of the device or adjusting utilization of the one or more allocated resources reduces interference with a reference signal transmitted during the self-calibration of the base station.

2. The method of claim 1, wherein the at least one of the deactivating the at least one component of the device or the adjusting the utilization of the one or more allocated resources is performed during a time period corresponding to the one or more allocated resources.

3. The method of claim 2, wherein the deactivating the at least one component of the device comprises:

entering a sleep mode of the device during the time period.

4. The method of claim 1, wherein the adjusting the utilization of the one or more allocated resources comprises:
determining one or more UEs that are served by the device and are within a communication range of the base station; and
refraining from assigning the one or more allocated resources to the one or more UEs.

5. The method of claim 1, wherein the adjusting the utilization of the one or more allocated resources comprises:
refraining from utilizing the one or more allocated resources for communication of the device.

6. The method of claim 1, further comprising:
receiving, from the base station, an additional resource indication indicating one or more additional resources allocated for the self-calibration of the base station; and
continuing to perform at least one of the deactivating the at least one component of the UE or the adjusting the utilization of the one or more additional resources for an additional time period corresponding to the one or more additional resources.

7. The method of claim 1, wherein the device is a user equipment (UE) or a neighboring base station.

8. A method of wireless communication by a base station, comprising:
allocating one or more resources for a self-calibration of the base station; and
transmitting, to one or more devices, a self-calibration notification indicating the allocated one or more resources, the one or more devices including at least one UE, or at least one neighboring base station, or a combination thereof; and
performing the self-calibration of the base station based on the allocated one or more resources, wherein the performing the self-calibration comprises:
transmitting a reference signal using the allocated one or more resources;
measuring one or more parameters from the transmitted reference signal; and
calibrating the base station based on the measured one or more parameters and based on one or more standard parameters.

9. The method of claim 8, wherein the reference signal includes at least one of a cell-specific reference signal, CSI reference signal or a calibration reference signal used for the self-calibration.

10. The method of claim 8, wherein the calibrating the base station is based on a comparison between the measured one or more parameters and the one or more standard parameters.

11. The method of claim 8, wherein the one or more parameters include at least one of an amplitude or a phase.

12. The method of claim 8, wherein the one or more resources include a plurality of transmit resources, and
wherein one or more of the plurality of transmit resources are used for each transmission of the reference signal based on a predefined pattern.

13. The method of claim 8, further comprising:
transmitting, to the one or more devices, an additional resource indication indicating one or more additional resources allocated for the self-calibration of the base station.

14. The method of claim 8, further comprising:
refraining from transmitting the self-calibration notification to one or more second devices if the second devices are not located in a region corresponding to the direction of a beam used for the self-calibration.

15. The method of claim 8, wherein the self-calibration notification is transmitted to the one or more devices if the one or more devices are located in a region corresponding to a direction of a beam used for the self-calibration.

16. A device for wireless communication, comprising:
a memory; and
at least one processor coupled to the memory and configured to:
receive, from a base station, a self-calibration notification indicating a self-calibration to be performed by the base station and one or more resources allocated for the self-calibration of the base station; and
perform, by the device, in response to the self-calibration notification, at least one of deactivating at least one component of the device based on the one or more allocated resources or adjusting utilization of the one or more allocated resources allocated for the self-calibration of the base station,
wherein the deactivating one component of the device or adjusting utilization of the one or more allocated resources reduces interference with a reference signal transmitted during the self-calibration of the base station.

17. The device of claim 16, wherein the at least one of the deactivating the at least one component of the device or the adjusting of the utilization of the one or more allocated resources is performed during a time period corresponding to the allocated one or more allocated resources.

18. The device of claim 17, wherein the at least one processor to perform the deactivating the at least one component of the device is configured to:
enter a sleep mode of the device during the time period.

19. The device of claim 16, wherein the at least one processor configured to perform the adjusting the utilization of the one or more allocated resources is configured to:
determine one or more UEs that are served by the device and are within a communication range of the base station; and
refrain from assigning the one or more allocated resources to the one or more UEs.

20. The device of claim 16, wherein the at least one processor configured to perform the adjusting the utilization of the one or more allocated resources is configured to:
refrain from utilizing the one or more allocated resources for communication of the device.

21. The device of claim 16, wherein the at least one processor is further configured to:
receive, from the base station, an additional resource indication indicating one or more additional resources allocated for the self-calibration of the base station; and
perform at least one of the deactivating the at least one component of the UE or adjusting utilization of the one or more additional resources for an additional time period corresponding to the one or more additional resources.

22. A base station for wireless communication, comprising:
a memory; and
at least one processor coupled to the memory and configured to:
allocate one or more resources for a self-calibration of the base station;
transmit, to one or more devices, a self-calibration notification indicating the allocated one or more resources, the one or more devices including at least one UE, or at least one neighboring base station, or a combination thereof; and perform the self-calibration of the base station based on the allocated one or more resources, wherein the at least one processor is further configured to:

transmit a reference signal using the allocated one or more resources;

measure one or more parameters from the transmitted reference signal; and calibrate the base station based on the measured one or more parameters and based on one or more standard parameters.

23. The base station of claim 22, wherein the reference signal includes at least one of a demodulation reference signal, a sounding reference signal or a calibration reference signal used for calibration.

24. The base station of claim 22, wherein the base station is calibrated based on a comparison between the measured one or more parameters and the one or more standard parameters.

25. The base station of claim 22, wherein the one or more resources include a plurality of transmit resources, and wherein one or more of the plurality of transmit resources are used for each transmission of the reference signal based on a predefined pattern.

26. The base station of claim 22, wherein the at least one processor is further configured to:

transmit, to the one or more devices, an additional resource indication indicating one or more additional resources allocated for the self-calibration of the base station.

27. The base station of claim 22, wherein the at least one processor is further configured to:

refraining from transmitting the self-calibration notification to one or more second devices if the second devices are not located in a region corresponding to the direction of a beam used for the self-calibration.

28. The base station of claim 22, wherein the self-calibration notification is transmitted to the one or more devices if the one or more devices are located in a region corresponding to a direction of a beam used for the self-calibration.

* * * * *